United States Patent
Takagi et al.

(10) Patent No.: US 6,670,991 B1
(45) Date of Patent: Dec. 30, 2003

(54) IMAGE SENSING SYSTEM, CONTROL METHOD, AND RECORDING MEDIUM FOR CONTROLLING A CAMERA APPARATUS UTILIZING A CLIENT DEVICE CONNECTED THERETO

(75) Inventors: Tsuneyoshi Takagi, Kawasaki (JP); Yoshihiro Ishida, Yokohama (JP); Takashi Oya, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/159,866

(22) Filed: Sep. 24, 1998

(30) Foreign Application Priority Data

Sep. 26, 1997 (JP) .............................. 9-261736
Oct. 28, 1997 (JP) .............................. 9-295522

(51) Int. Cl.$^7$ ................ H04N 5/232; H04N 1/387; G03B 13/00; G06K 9/56; G06K 9/40
(52) U.S. Cl. .............. 348/349; 348/345; 348/350; 358/453; 382/255; 382/205
(58) Field of Search .......................... 348/211.8, 350, 348/349, 207.11, 169, 207.1, 362, 208.12, 211.3, 211.6, 211.7, 211.9, 211.13, 211.14, 218.1, 333.02, 345, 346, 364, 557, 170, 357; 282/255, 299; 382/205, 271; 358/453

(56) References Cited

U.S. PATENT DOCUMENTS

| | | | | |
|---|---|---|---|---|
| 5,420,635 A | * | 5/1995 | Konishi et al. .......... 348/229.1 |
| 5,473,369 A | * | 12/1995 | Abe ......................... 348/169 |
| 5,479,206 A | * | 12/1995 | Ueno et al. .............. 348/143 |
| 5,625,415 A | * | 4/1997 | Ueno et al. .............. 348/346 |
| 5,629,735 A | * | 5/1997 | Kaneda et al. ............. 348/345 |
| 5,686,960 A | * | 11/1997 | Sussman et al. .......... 348/218.1 |
| 5,757,424 A | * | 5/1998 | Frederick ................. 348/14.12 |
| 5,793,367 A | * | 8/1998 | Taguchi .................... 345/756 |
| 5,907,353 A | * | 5/1999 | Okauchi .................. 348/218.1 |
| 6,008,837 A | * | 12/1999 | Yonezawa ................ 348/211.8 |
| 6,118,484 A | * | 9/2000 | Yokota et al. ............. 348/170 |
| 6,144,403 A | * | 11/2000 | Otani ....................... 348/14.12 |
| 6,163,342 A | * | 12/2000 | Suzuki ..................... 348/222.1 |
| 6,266,085 B1 | * | 7/2001 | Kato et al. ................ 348/211.7 |
| 6,359,650 B1 | * | 3/2002 | Murakami ............... 348/333.04 |
| 6,380,972 B1 | * | 4/2002 | Suga et al. ............... 348/333.02 |
| 6,417,883 B1 | * | 7/2002 | Kaneda .................... 348/350 |

FOREIGN PATENT DOCUMENTS

JP   04114135 A   *  4/1992   .......... G03B/13/04

* cited by examiner

*Primary Examiner*—Wendy R. Garber
*Assistant Examiner*—John M Villecco
(74) *Attorney, Agent, or Firm*—Morgan & Finnegan, LLP

(57) ABSTRACT

In an image sensing system where a camera apparatus and a client device are connected for controlling the camera apparatus by the client device, the client device displays and arbitrarily shifts a predetermined size of detection area in an object image sensed by the camera apparatus, enabling to quickly perform camera parameter control, such as focus adjustment or the like, based on image signals of the detection area, with a small amount of transferring data. Moreover, detection areas of a sensed image are synthesized by controlling camera parameters for each of the detection areas so as to optimize camera parameters for all of the areas in the object image.

13 Claims, 23 Drawing Sheets

FIG. 11

| CAMERA TYPE | SIZE OF DETECTION AREA (HORIZONTAL SIZE, VERTICAL SIZE) |
|---|---|
| A TYPE | (180, 90) |
| B TYPE | (80, 80) |
| ⋮ | |

1201 ENTIRE IMAGE
1202 FOCAL POINT DETECTION AREA 1203  1204

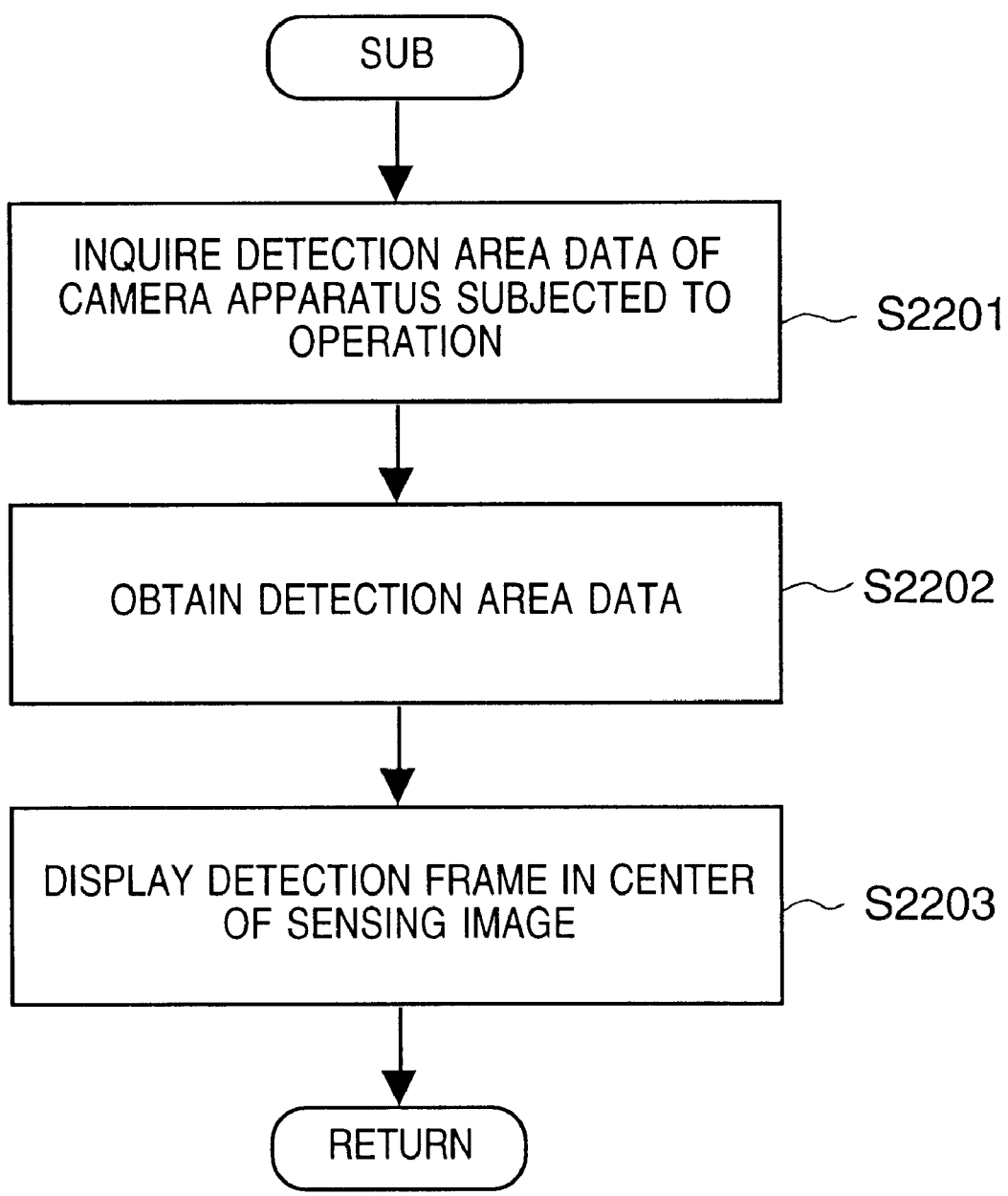

IMAGE SENSING SYSTEM, CONTROL METHOD, AND RECORDING MEDIUM FOR CONTROLLING A CAMERA APPARATUS UTILIZING A CLIENT DEVICE CONNECTED THERETO

BACKGROUND OF THE INVENTION

The present invention relates to an image sensing system and control method thereof and, more particularly, to an image sensing system where a camera apparatus and a client device are connected, and a method of controlling the camera apparatus by the client device.

The assignee of the present invention has already developed an image sensing system, where a camera apparatus and a computer are connected via an RS serial cable or the like, for controlling an image sensing direction or zoom ratio of a camera apparatus by panning (rotate on a vertical axis) or tilting (rotate on a horizontal axis) the camera apparatus in accordance with a control command sent by a computer terminal. In such system, the computer includes software for operating a camera apparatus so that it is possible for an operator to operate the camera apparatus from the computer terminal by sending a control command by using a keyboard or mouse or the like.

In a case where the camera apparatus, connected to a computer terminal, includes functions for automatic focus (AF) and automatic exposure (AE), a control command related to AF or AE may be performed from the computer side.

In a case of utilizing a so-called electronic overhead projector (OHP) apparatus which senses an object (document or the like) placed on a platen, the focal point of the camera apparatus is adjusted so that the document placed on the platen is focused.

In the conventional image sensing system, however, the focal point and exposure are normally adjusted to focus the center of a sensing object. Therefore, in order to focus or adjust the exposure for an object which is not in the center of the sensing image, the camera apparatus must be panned or tilted to place the object of interest in the center of the sensing image. Such operation is cumbersome since the position of detection area of the camera apparatus must be adjusted.

Furthermore, in a case where a three-dimensional object is placed on the platen and sensed by the electronic OHP, the focal point must be manually adjusted to focus the portion subjected to image sensing.

Furthermore, there is an image sensing system which improves the quality of the sensed image by obtaining focus data and lightness data. In the image sensing system of this type, conventionally, an image is sensed by detecting a portion of signals of the image to control focusing.

However, in the conventional image sensing system, optical parameters set only for a portion of the image are applied to the entire image. Therefore, in a case where the image includes portions whose depth and lightness greatly vary, the sensed image of these portions are out of focus or exposure is not appropriate. Moreover, in a case where a wide angle image is sensed, a lens having a large field of view angle is generally used. In this case, a similar problem also occurs because the optical parameters are set based only on a part of the image.

SUMMARY OF THE INVENTION

The present invention is made in consideration of the above situation, and has as its object to provide an image sensing system for controlling a camera apparatus by utilizing a client device which is connected to the camera apparatus. More specifically, the present invention provides an image sensing system and control method thereof which enables the client device to quickly control camera parameters to perform image sensing of a desired area of an image and enables to quickly indicate the area where camera parameters are controlled.

According to the present invention, the foregoing object is attained by providing an image sensing system where a camera apparatus and a client device are connected for controlling the camera apparatus by the client device, comprising: image sensing means for sensing an object and obtaining an image signal thereof; detection area control means for controlling a detection area in the image signal; adjusting means for adjusting a camera parameter based on an image signal of the detection area; storage means for storing a shape and size of the detection area; display means for superimposing the detection area on an image obtained by the image sensing means after the adjusting means adjusts the camera parameter, based on the position, shape and size of the detection area; and shift instructing means for instructing the detection area control means to shift the detection area.

Since data related to the size and shape of detection area is stored in storage means in advance, the only information the shift instructing means needs to pass to the detection area control means is the amount of shift in the detection area. Accordingly, the adjusting means can quickly control the camera parameters based on the detection area, and display means can quickly indicate the detection area on the displayed sensed image.

It is another object of the present invention to provide an image sensing system and control method thereof which enables immediate focusing on a desired portion of an object, even in a case where a three- dimensional object is sensed.

According to an aspect of the present invention, the aforementioned camera apparatus is an electronic overhead projector (OHP) which senses an object placed on a platen.

By virtue of the above, an object placed on a platen can be immediately focused on each of the detection areas.

It is another object of the present invention to provide an image sensing system and method thereof which enables sensing an image where the camera parameters are optimized for the entire area of the image.

According to the present invention, the foregoing object is attained by providing an image sensing system where a camera apparatus and a client device are connected for controlling the camera apparatus by the client device, comprising: image sensing means for sensing an object and obtaining an image signal of the object; detecting means for detecting an image signal of a detection area in the obtained image signal; adjusting means for adjusting a camera parameter based on the image signal of the detection area; storage means for storing the image signal of the detection area sensed by the image sensing means after the adjusting means adjusts the camera parameter; shifting means for shifting the detection area; and image synthesizing means for synthesizing image signals of a plurality of detection areas stored in the storage means.

Accordingly, the present invention enables adjusting the camera parameters in unit of detection areas of an image which is sensed by the image sensing means and obtain a synthesized image by using the image synthesizing means.

It is another object of the present invention to provide an image sensing system and method thereof which controls differences of camera parameters in the synthesized image, which have been optimized by detection area units.

According to an aspect of the present invention, the storage means stores only image signals of an effective area in the detection area, and the image synthesizing means synthesizes images of a plurality of the effective areas stored in the storage means.

Accordingly, even if distances of focal points are extremely different in each of the detection areas, since very small effective areas in the detection areas are synthesized, differences of camera parameters in adjacent effective areas can be controlled.

It is another object of the present invention to provide an image sensing system and method thereof which can sense an omnidirectional image, and an image whose camera parameters are optimized in all areas of the image.

According to an aspect of the present invention, the aforementioned image sensing system further comprises direction control means for controlling an image sensing direction of the image sensing means, wherein the synthesizing means synthesizes images in unit of the image sensing direction controlled by the direction control means.

Accordingly, it is possible to obtain a synthesized image whose camera parameters are adjusted in each of the detection areas in an omnidirectional image.

The present invention is particularly advantageous since it enables reducing the amount of data in a command to shift the detection area. By virtue of this, camera parameter control in the detection area and displaying the detection area can be quickly performed.

Moreover, it is possible to sense an image where camera parameters are optimized in all areas of the image.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention, and together with the description, serve to explain the principles of the invention.

FIG. 11 is a table showing correspondences of a type of camera apparatus and specification of a camera apparatus;

FIG. 22 is a flowchart showing modified processing of the initializing processing shown in FIG. 10.

DETAILED DESCRIPTION OF THE PREFERRED EMBODIMENTS

Preferred embodiments of the present invention will be described in detail in accordance with the accompanying drawings.

First Embodiment

Figure 1:
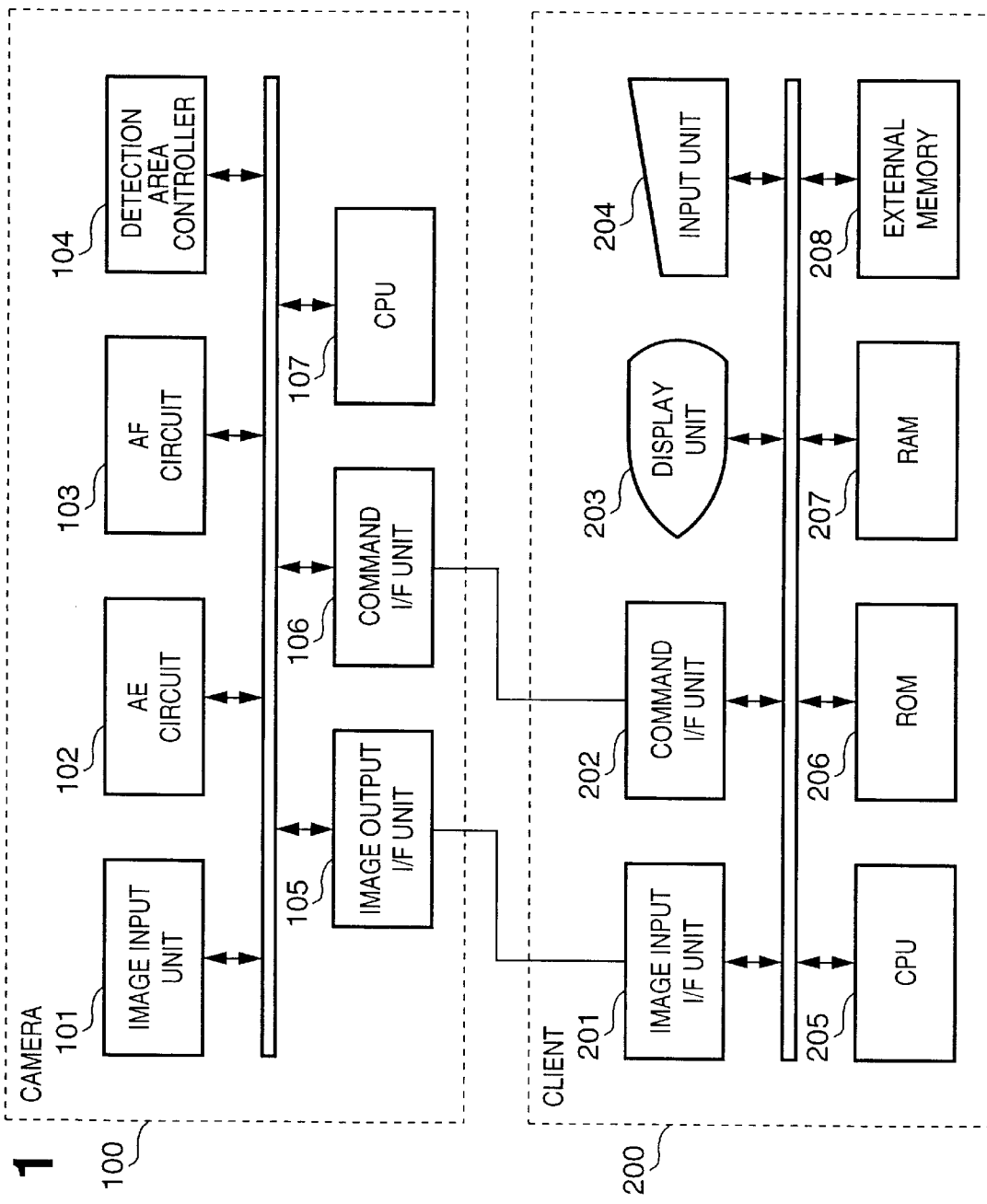
FIG. 1 is a block diagram showing an image sensing system according to an embodiment of the present invention.

FIG. 1 is a block diagram showing an image sensing system according to a present embodiment. In FIG. 1, reference numeral 100 denotes a camera apparatus, primarily comprising components referred to by numerals 101 to 107 which will be described below. Reference numeral 200 denotes a computer terminal (hereinafter referred to as a client) primarily comprising components referred to by numerals 201 to 208.

First, the construction of the camera apparatus 100 is described. An image input unit 101 includes a lens unit having a lens for adjusting a focal point, a diaphragm which adjusts the amount of light, and a CCD which converts an optical image inputted through these components into electrical signals.

An automatic exposure (AE) circuit 102 controls shutter speed, aperture stop, auto gain control (AGC) or the like and adjusts an exposure based on image signals obtained by the CCD. An automatic focus (AF) circuit 103 extracts a high frequency components from the image signals obtained by the CCD and performs control such that the lens is driven to the sharpest focus. In the present embodiment, the pulse value of a motor, provided for driving the focus lens, is adopted as a parameter for AF control.

Reference numeral 104 denotes a detection area controller which controls the position of detection area subjected to AE or AF control with relative to the image subjected to image sensing. The detection area controller 104 can shift the detection area in accordance with a command sent by the client 200. Note that the detection area varies depending on the specification of a camera apparatus.

An image output I/F unit 105 is connected to an image input I/F unit 201 of the client 200. The image output I/F unit 105 outputs to the client 200, image data on which a predetermined processing e.g., compression or the like, has been performed. A command I/F unit 106 is connected to a command I/F unit 202 of the client 200 via cable, e.g., RS232C or the like. The command I/F unit 106 receives/transmits various control commands or data related to camera parameters. A CPU 107 performs overall control of the entire camera apparatus 100. The CPU 107 makes various portions of the camera apparatus 100 execute appropriate processing according to a control command sent by the client 200.

Next, the construction of the client 200 is described. An image input I/F unit 201 receives image data transmitted by the camera apparatus 100 and a command I/F unit 202 outputs a control command to the camera apparatus 100. A display unit 203 includes a CRT or LCD or the like for displaying an image sensed by a camera apparatus based on the received image data.

Figure 7:
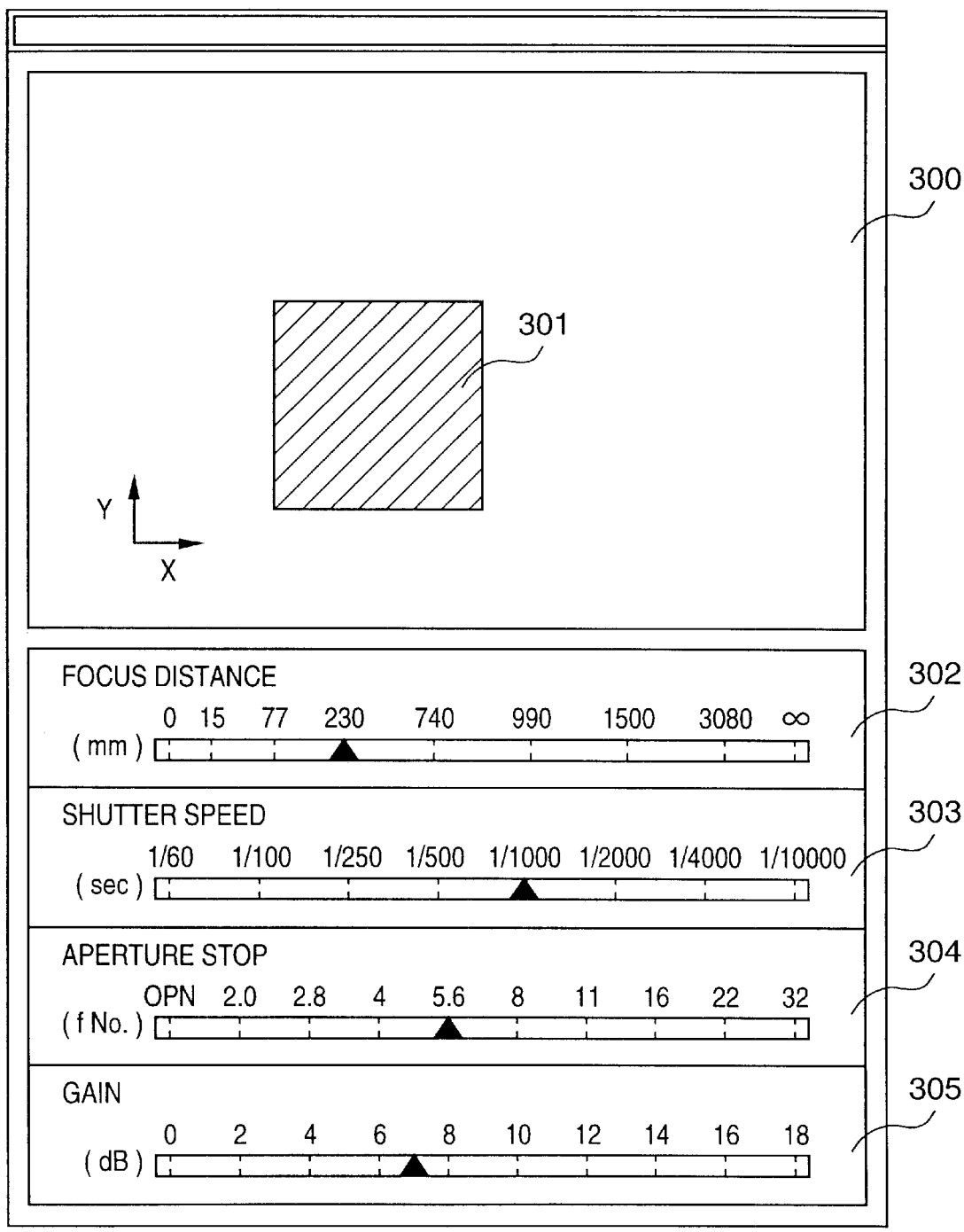
FIG. 7 is a display screen view of a display unit.

FIG. 7 shows an example of a display screen of the display unit 203. Referring to FIG. 7, reference numeral 300 denotes a sensed image; and reference numeral 301 denotes a detection frame (detection area) where image signals are detected by the camera apparatus 100 and AF control, AE control or the like are performed. Also displayed on the display screen are camera parameters shown by respective bar indicators based on the camera parameter values received via the command I/F unit 202. The camera parameters include: a distance between an object subjected to image sensing and the camera apparatus (focus distance) indicated by reference numeral 302, shutter speed 303, aperture stop 304, gain 305 and zoom ratio.

Referring back to FIG. 1, an input unit 204 includes a keyboard or a mouse serving as a pointing device, for inputting a control command by an operator. For instance, an instruction to shift the detection area is inputted by the input unit 204. A CPU 205 performs overall controlling of the client 200. Based on programs stored in the ROM 206, which are read out of the ROM 206 and stored in the RAM 207, the CPU executes processing for various operation.

Figure 8:
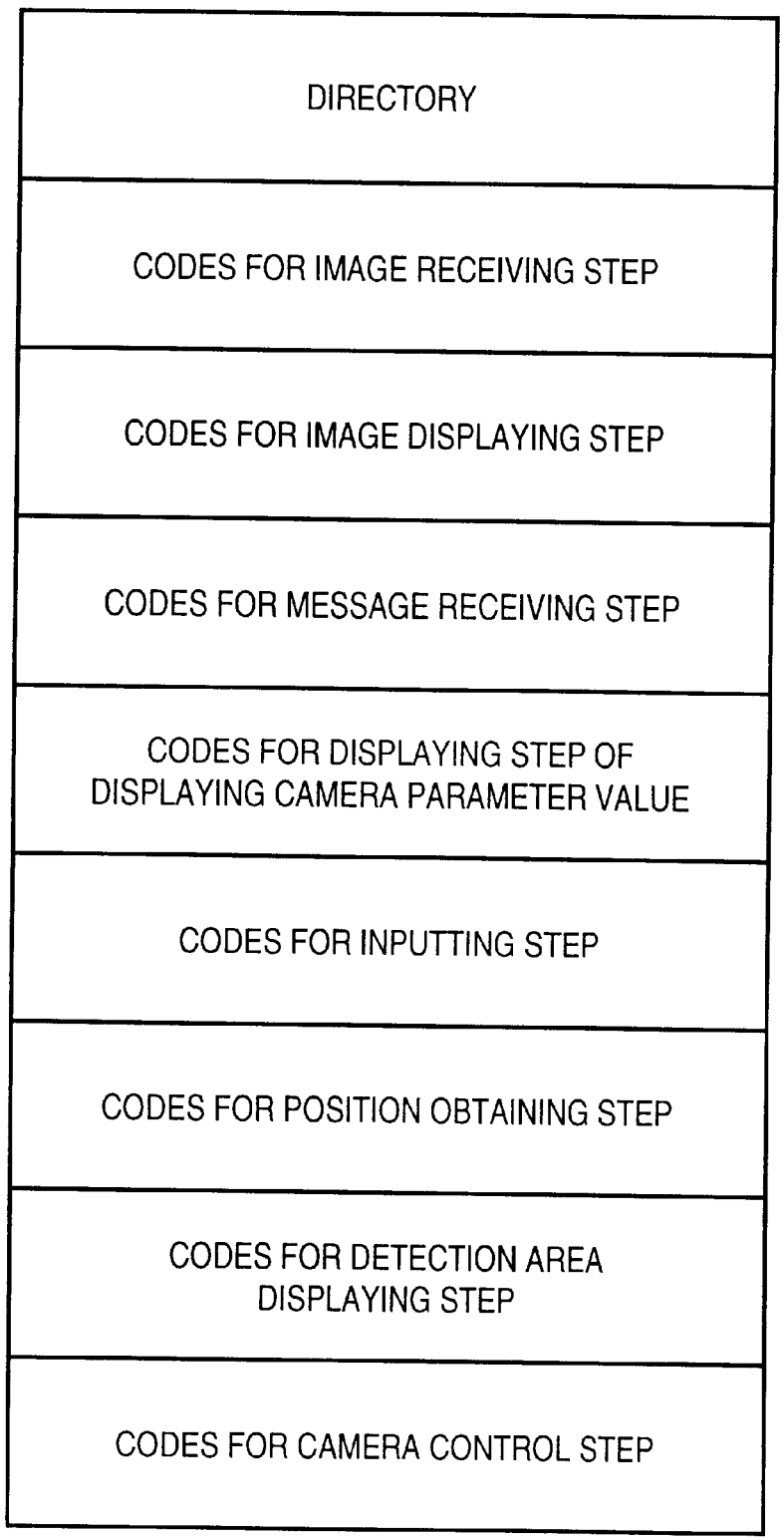
FIG. 8 is an explanatory view of a memory map for various programs according to a present embodiment.

A ROM 206 stores various programs for executing processing on data inputted by the input unit 204 or executing processing for the CPU 205. FIG. 8 shows, as an example, programs stored in the ROM 206. A RAM 207 provides a work area for various programs, as described above, or provides a temporary storage area for data inputted by the input unit 204.

An external memory 208 is exemplified by a floppy disc drive (FDD), hard disc, CD-ROM or the like, which can store programs for the client 200 to perform processing. The stored program can be executed by transferring the program to the RAM 207. Note that in the present embodiment, the size and shape of detection area of an image signal are stored in a table, in the external memory 208 for performing AF or the like in accordance with the specification of a camera apparatus. The table is shown in FIG. 11.

Figure 2:
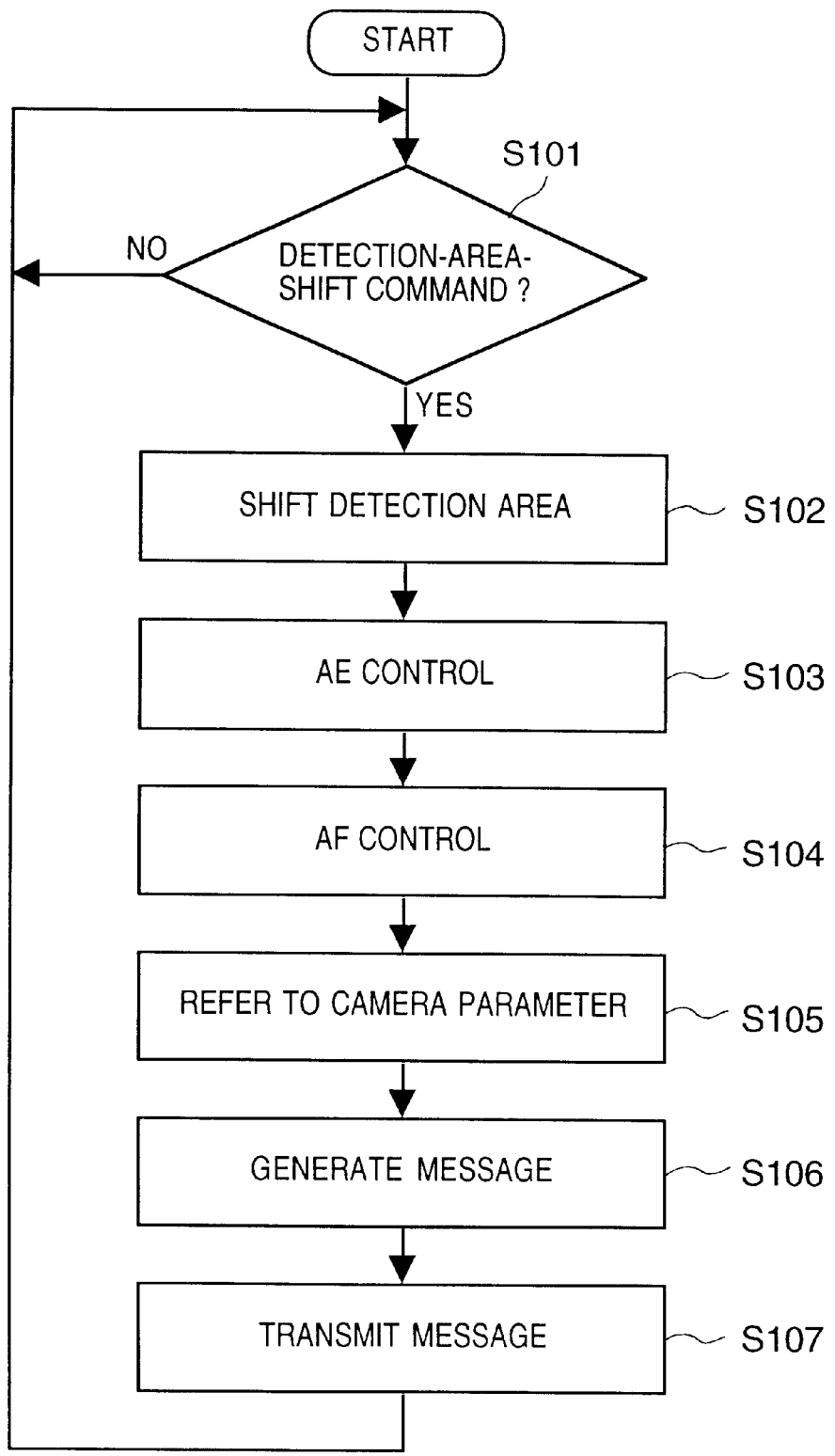
FIG. 2 is a flowchart showing operation of a camera apparatus according to the present embodiment.

Next, operation processing of the image sensing system according to the present embodiment is described. FIG. 2 is a flowchart showing the operation performed by the camera apparatus 100 in a case where a command for shifting the detection area of an image signal is inputted by the client 200. Note that the processing shown in the flowchart in FIG. 2 is performed by the CPU 107.

Referring to FIG. 2, in a case where a command sent by the client 200 is interpreted as a detection-area-shift command in step S101, the detection area controller 104 shifts the detection area in pixel unit on the sensed image in step S102. In a case where the command is not interpreted as a detection-area-shift command in step S101, other processing which is not shown in FIG. 2 is executed.

For the purpose of simplified description, it is assumed in the present embodiment that the detection area is rectangular. Furthermore, it is assume that the detection-area-shift command sent by the client 200 includes a variance amount ($\Delta x, \Delta y$) with relative to the current position of the detection area ($\Delta x$: the number of pixels shifted in the horizontal direction, $\Delta y$: the number of pixels shifted in the vertical direction). Note that the shift command is not limited to this example. Assuming the top left corner of an image is the origin (0, 0), coordinates data with relative to the origin may be received as a shift command.

In steps S103 and S104, image signals in the shifted detection area are extracted, AE control is executed by the AE circuit 102 and AF control is executed by the AF circuit 103.

Figure 5:
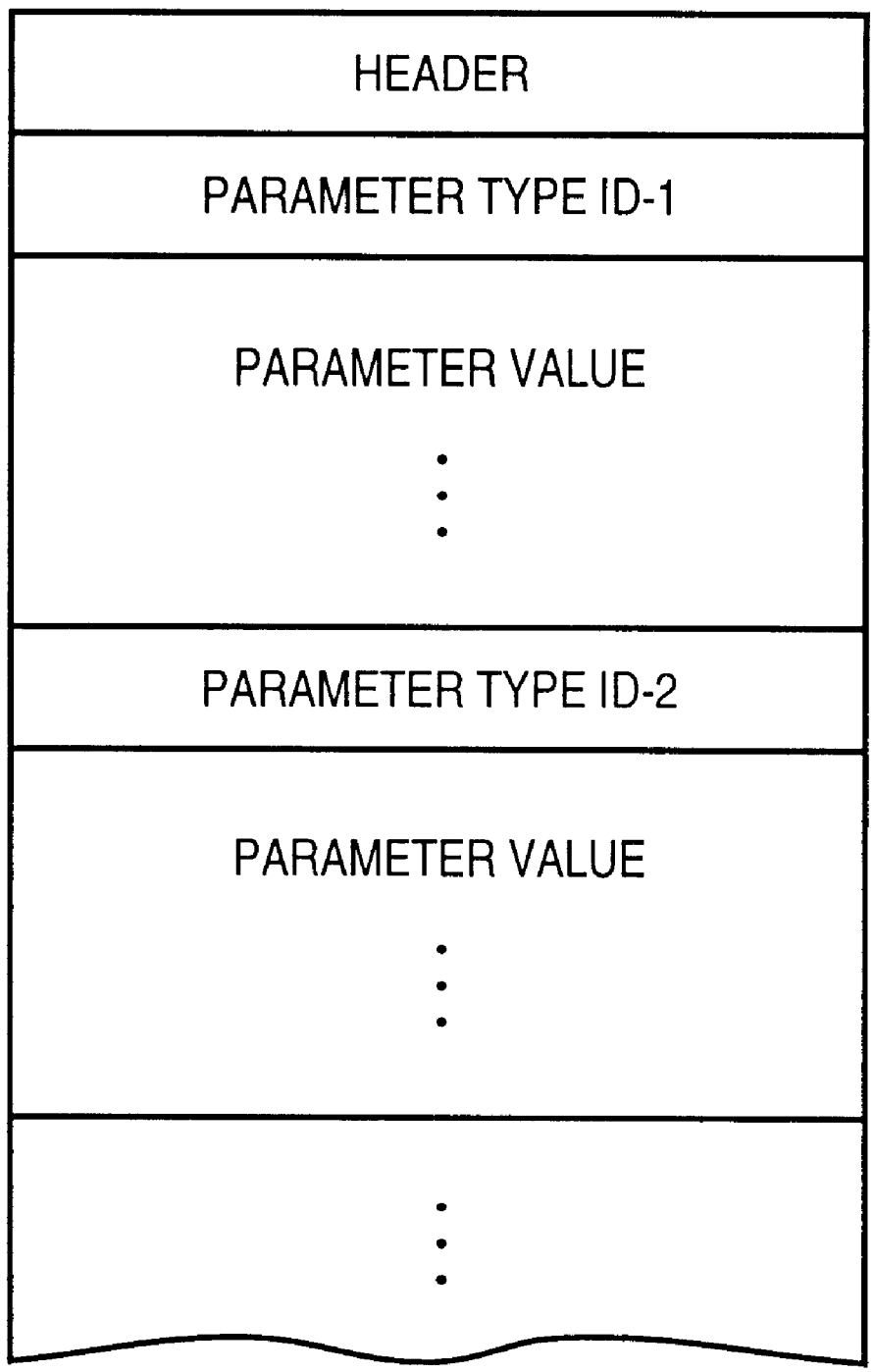
FIG. 5 is an explanatory view showing the form of message data.

In step S105, the CPU 107 refers to camera parameter values such as an exposure value and distance to an object or the like, respectively controlled by the AE circuit 102 and AF circuit 103. In step S106, message data accompanied by the current position of the detection area and the values of camera parameters is generated, and in step S107, the message data is transmitted to the client 200. FIG. 5 shows the form of the message data. An identifier (ID) indicating the type of the parameter is added to the message data.

Figure 3:
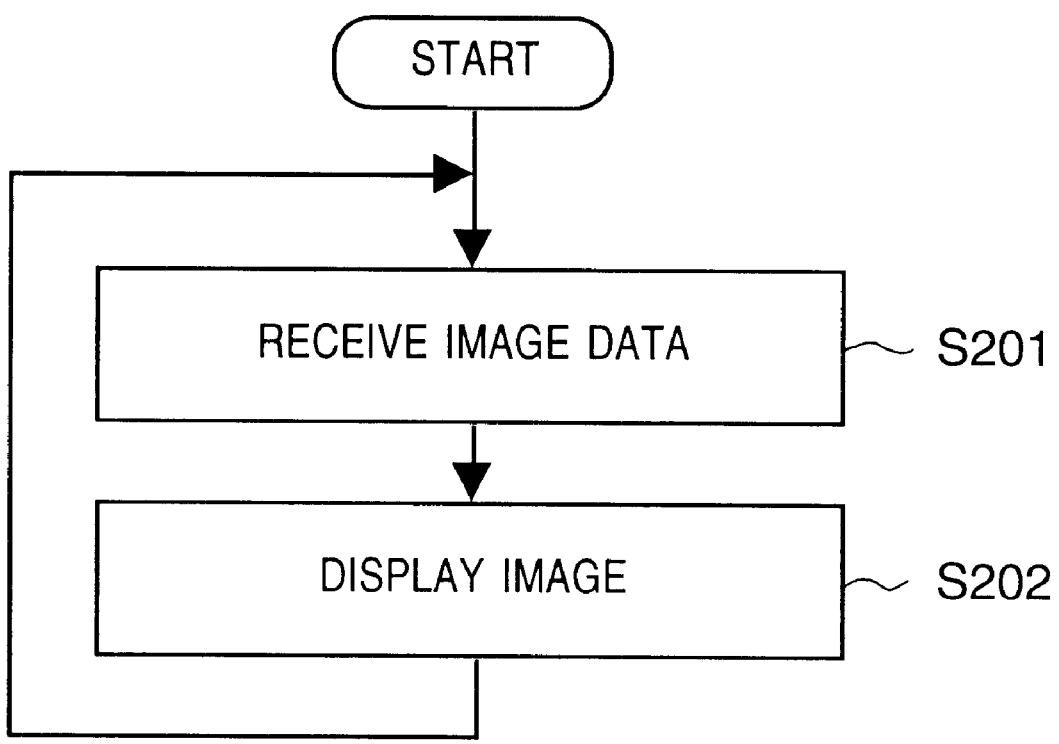
FIG. 3 is a flowchart showing operation of a client according to the present embodiment.

FIG. 3 is a flowchart showing the operation related to image reception processing performed by the client 200. In step S201 in FIG. 3, when image data is inputted to the camera apparatus 100 through the image input I/F unit 201, a sensed image is displayed on the display unit 203 in step S202. The sensed image herein is an image picked up by the camera apparatus 100 which has performed image sensing based on camera parameters, e.g., focus, aperture stop or the like.

Figure 4:
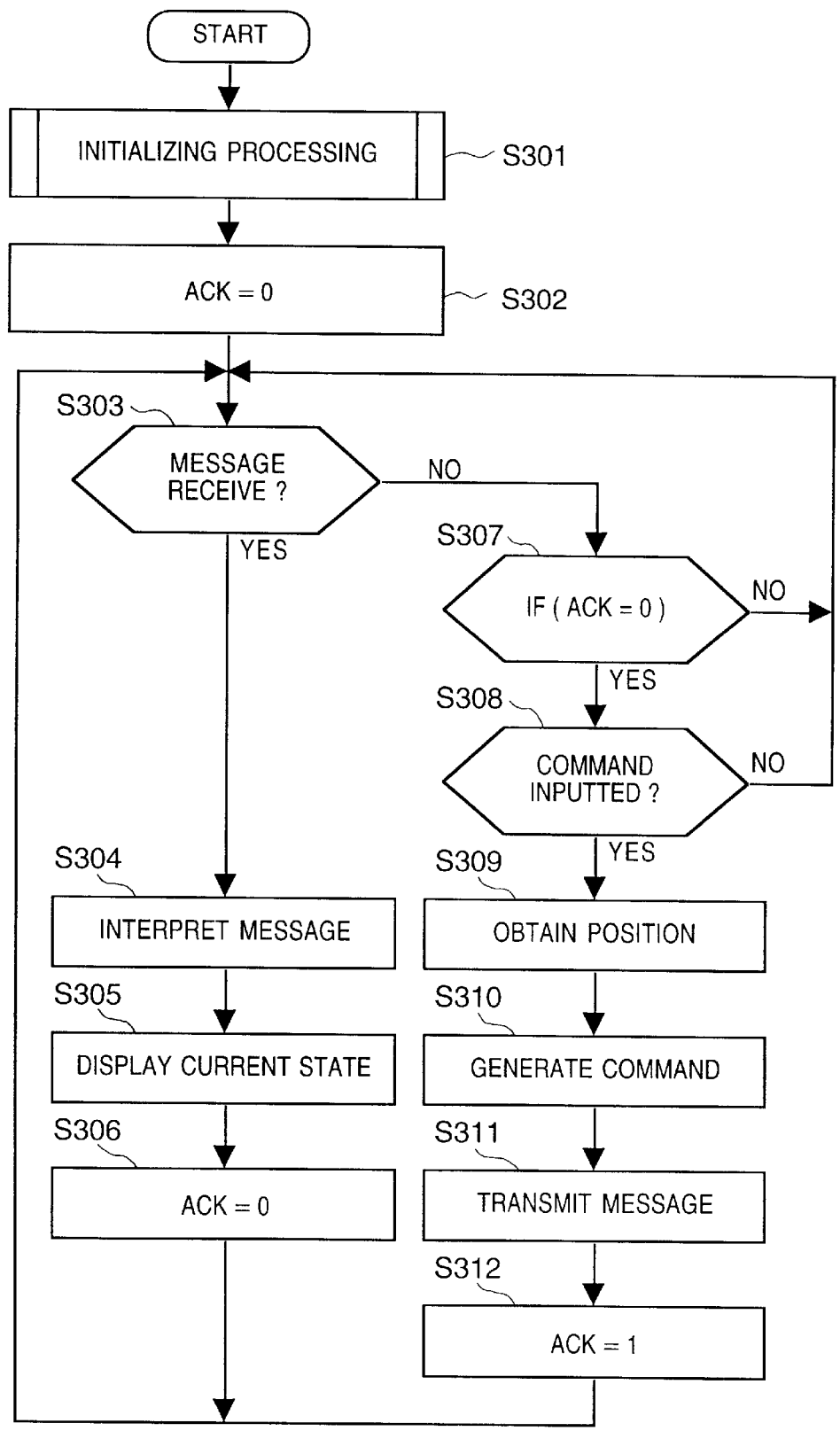
FIG. 4 is a flowchart showing operation of a client according to the present embodiment.

FIG. 4 is a flowchart showing operation of a client apparatus in a case where the client 200 operates the camera apparatus 100.

In step S301 in FIG. 4, initializing is performed when the operation of the client 200 is started.

Figure 10:
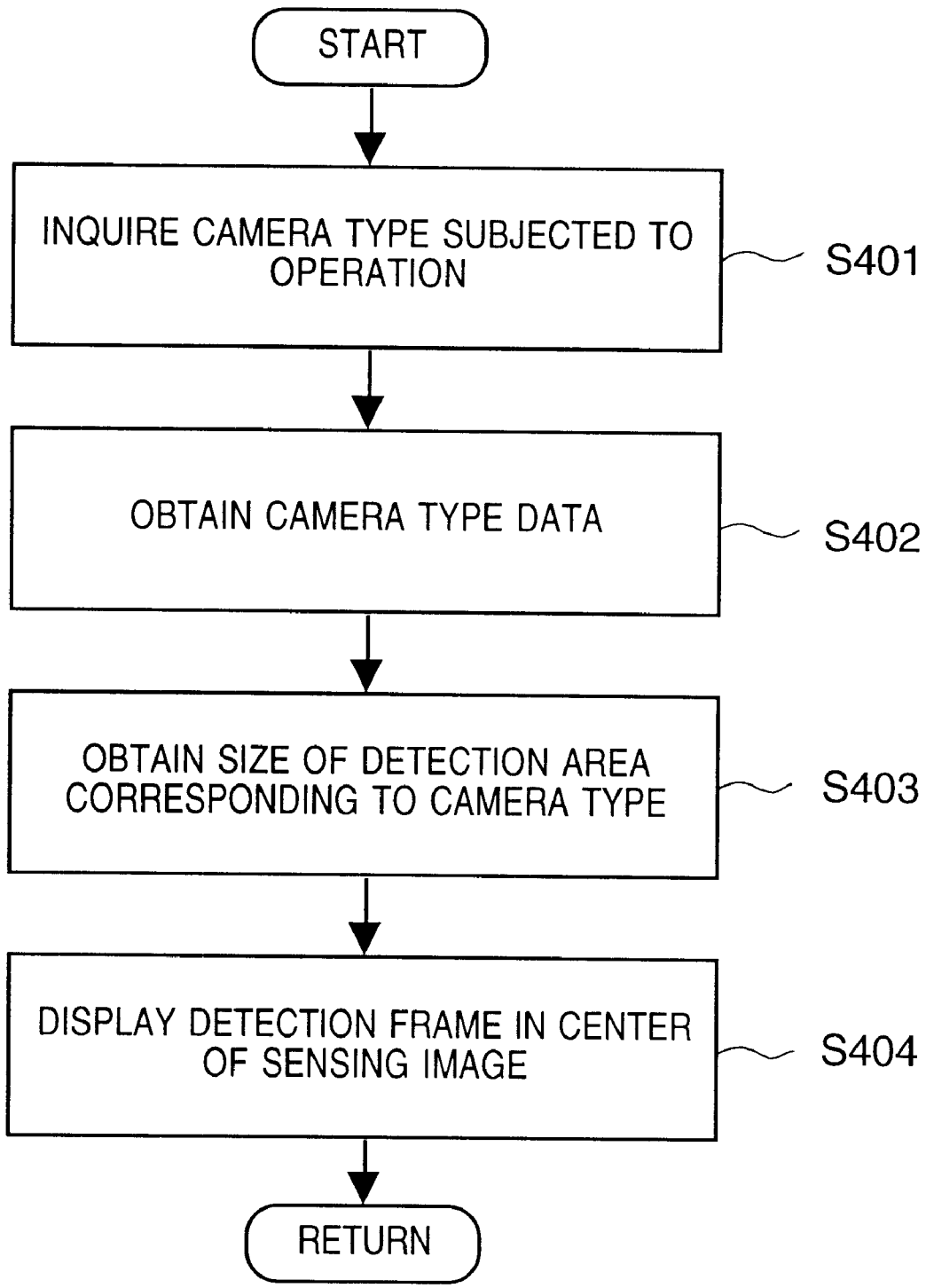
FIG. 10 is a flowchart showing operation processing of a camera control system according to the present embodiment.

Herein, the subroutine of step S301 in FIG. 4, i.e., initializing processing, is shown in the flowchart in FIG. 10. In step S401 in FIG. 10, the client 200 transmits a command, inquiring the specification of the camera apparatus, to the camera apparatus 100 subjected to operation through the command I/F unit 202. Upon receiving data related to the specification of the camera apparatus from the camera apparatus 100 in step S402, the client 200 obtains in step S403, the size of a detection area, corresponding to the type of camera apparatus 100, from the table shown in FIG. 11 stored in the external memory 208. In a case where it is determined based on the response from the camera apparatus 100 that the specification of the camera apparatus 100 is, e.g., type A, the table shown in FIG. 11 is referred in order to obtain the size of a detection area for type A. Referring to the table in FIG. 11, in a case the shape of detection area varies depending on the camera apparatus, the shape may be stored in association with the camera specification.

In step S404, the detection frame 301 corresponding to the size of a detection area obtained from the table is superimposed in the center portion of the sensed image 300 displayed on the display unit 203 as shown in FIG. 7.

As set forth above, since data related to the size of the detection area is stored in association with the type of camera apparatus 100, the client 200 can superimpose an appropriate form of a detection frame on the screen displaying the sensing image without obtaining data for the size of a detection area from the camera apparatus 100 in the initializing processing in step S301 in FIG. 4. Furthermore, in a case of sending a command to shift the detection area as will be described later, the client 200 does not need to exchange data related to the size of the detection area with the camera apparatus 100, thus making it possible to reduce the amount of data for transmission/reception.

In the initializing processing of the client 200 shown in the flowchart in FIG. 10, although the client 200 inquires of the specification of the camera apparatus to the camera apparatus 100, the client 200 may directly inquire of the size and shape of detection area of the camera apparatus without including the table shown in FIG. 11. FIG. 22 shows the modified example of the initializing processing in FIG. 10.

In step S2201 in FIG. 22, the client 200 inquires for data related to the detection area of the camera apparatus 100, subjected to operation, via the command I/F unit 202. In response to the inquiry command, the camera apparatus 100 outputs data related to the detection area to the client 200 through the command I/F unit 106.

Herein, data related to the detection area is information indicative of the size and shape of detection area. For instance, if the shape of detection area of the camera apparatus 100 is rectangular, the data outputted to the client 200 includes information indicative of the vertical and horizontal lengths of the rectangle in addition to information indicating that the detection area is rectangular. If the shape of detection area of the camera apparatus 100 is circular, the data outputted to the client 200 includes information indicative of the radius in addition to information indicating that the detection area is circular. If the shape of detection area of the camera apparatus 100 is an equilateral triangle, the data outputted to the client 200 includes information indicative of the length of a side of the triangle in addition to information indicating that the detection area is a equilateral triangle.

Upon receiving the above-described data related to the detection area from the camera apparatus 100 in step S2202, the client 200 superimposes the detection frame 301 in the center of the sensed image 300 in step S2203 based on the obtained data.

In a case where the processing shown in FIG. 22 is performed, the table shown in FIG. 11, storing detection area data for respective specifications of camera apparatuses, does not need to be stored in the client terminal 200. Accordingly, the amount of data stored in the external memory 208 can be reduced.

Referring back to the flowchart in FIG. 4, in step S302, the client 200 initializes a variable ACK which indicates whether or not a response message from the camera apparatus 100 is received. In the present embodiment, the initial value of the variable ACK is set to 0. More specifically, if the value of the variable ACK is 0, a response from the camera apparatus has been received, while if the value of the variable ACK is 1, a response from the camera apparatus has not been received. The value of the variable ACK is written in the RAM 207 so that the value can be referred to at any time.

In step S303, determination is made as to whether or not a message from the camera apparatus 100 is received through the command I/F unit 202. In a case where a message is received, the received message is interpreted in step S304 to interpret camera parameters and position information of the detection area included in the message. In step S305, the position of the detection frame 301 and positions of cursors for the display portions 302 to 305 are updated on the display screen of the display unit 203 shown in FIG. 7 based on the interpreted data.

In step S306, the value of the variable ACK is reset to 0 and the processing returns to step S303.

As described above, since the client 200 obtains camera parameters from the camera apparatus 100 and displays the obtained data, information related to the currently focused distance and exposure of the camera apparatus 100 are clear to an operator.

Meanwhile, in a case where determination is made in step S303 that a message has not been received, the processing proceeds to step S307 where determination is made as to whether or not the value of the variable ACK is 0. If the value of the variable ACK is not 0, the processing returns to step S303. In a case where the value of the variable ACK is 0, determination is made in step S308 whether or not a command for shifting the position of the detection area is inputted by an operator through the input unit 204. If the command is not inputted, the processing returns to step S303.

In a case where a command is inputted in step S308, the processing proceeds to step S309 where the amount of shift with respect to the current position is obtained. In step S310, a command for instructing the camera apparatus 100 to shift the detection area is generated.

Figure 6:
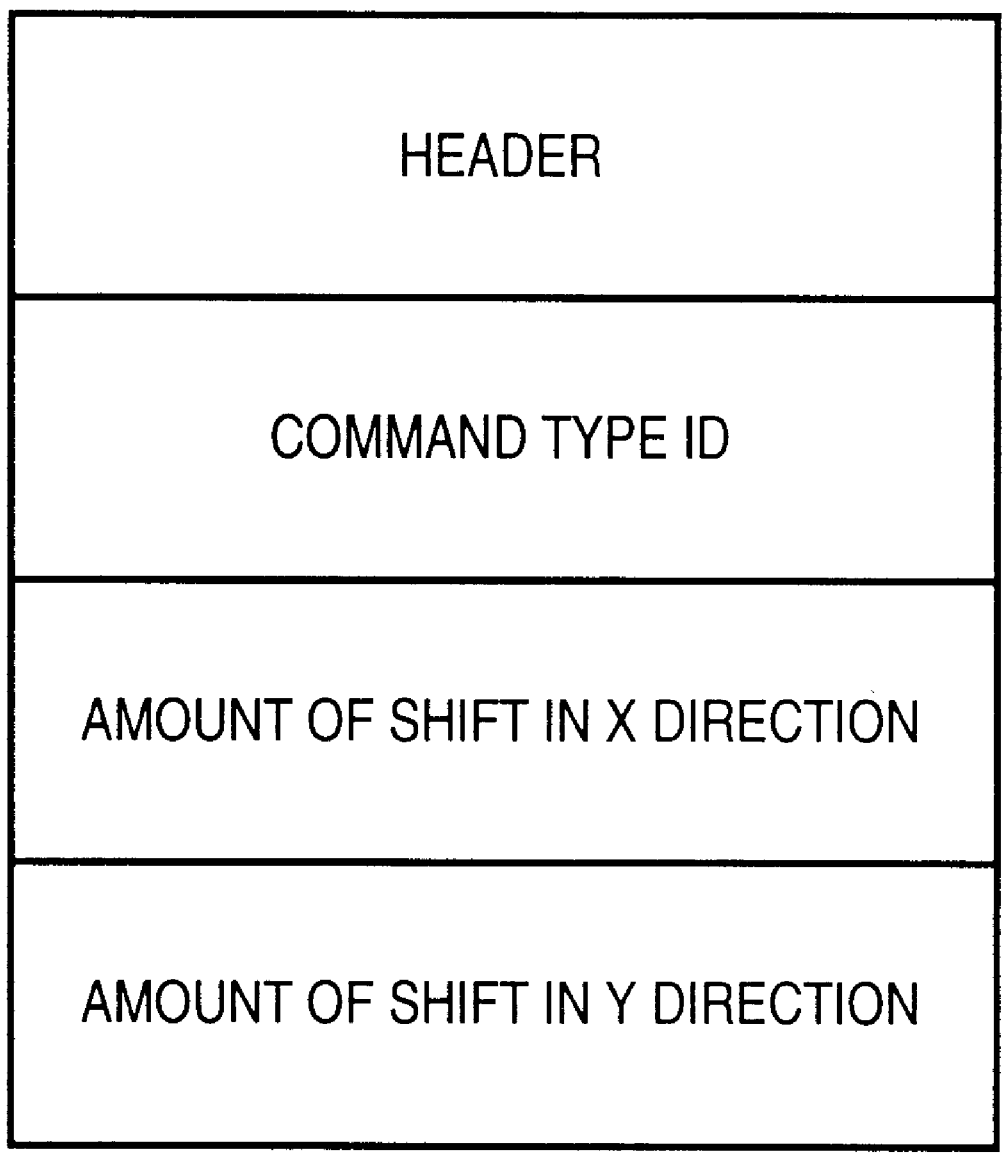
FIG. 6 is an explanatory view showing the form of shift instructing command.

Shown in FIG. 6 is a form of a detection-area-shift command to be sent to the camera apparatus 100. As shown in FIG. 6, the detection-area-shift command only includes data related to the amount of shift for X and Y directions. Since data related to the size of the detection area is known to both sides of the camera apparatus 100 and the client 200, the data for the size of the detection area does not need to be transmitted; thus, the amount of communication data can be reduced. Note that the detection-area-shift command is generated in response to dragging operation or the like inputted in the detection frame 301 of the displayed image 300 by the input unit 204 e.g., a mouse or the like.

In step S311, the command generated as described above is transmitted to the camera apparatus 100 through the command I/F unit 202. In step S312, the value of the variable ACK is set to 1 and the processing returns to step S303.

Figure 9:
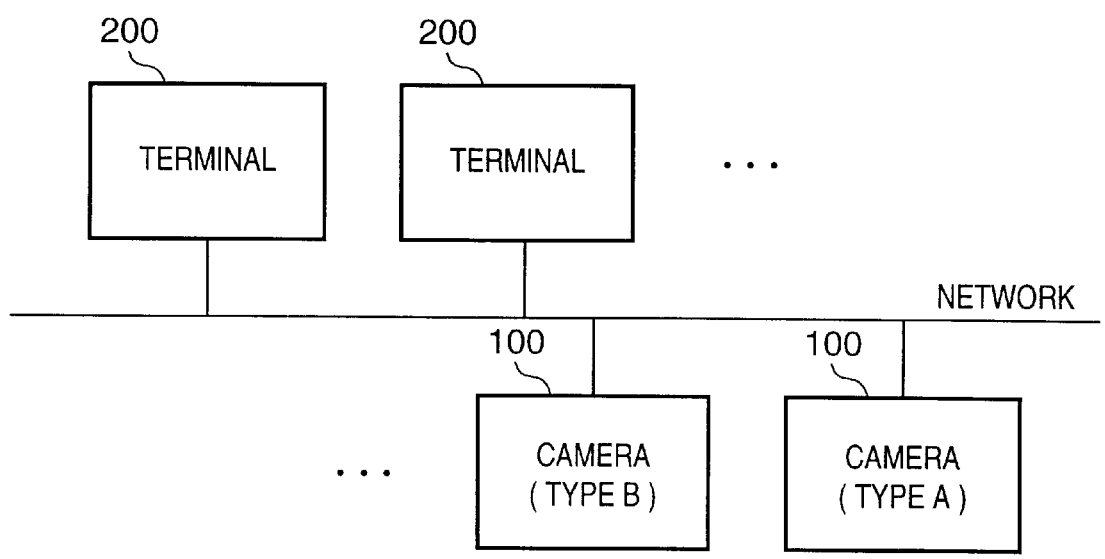
FIG. 9 is a conceptualized block diagram showing a camera control system in a case where camera apparatuses are connected with computer terminals via network.

Note that although the camera apparatus 100 and client 200 are connected on a one-to-one basis in the construction of the image sensing system shown in FIG. 1, a plurality of camera apparatuses and a plurality of clients may be connected via network as shown in FIG. 9. In this case, specifications of the camera apparatuses may vary. In such case, the table such as that shown in FIG. 11 is stored in each of the clients 200. In the table in FIG. 11, the size and shape of detection area for each specification of a camera apparatus is stored in advance.

Note that in the present embodiment, the camera parameters outputted from the camera apparatus to the client may also include a zoom ratio of the camera apparatus.

Second Embodiment

Figure 12:
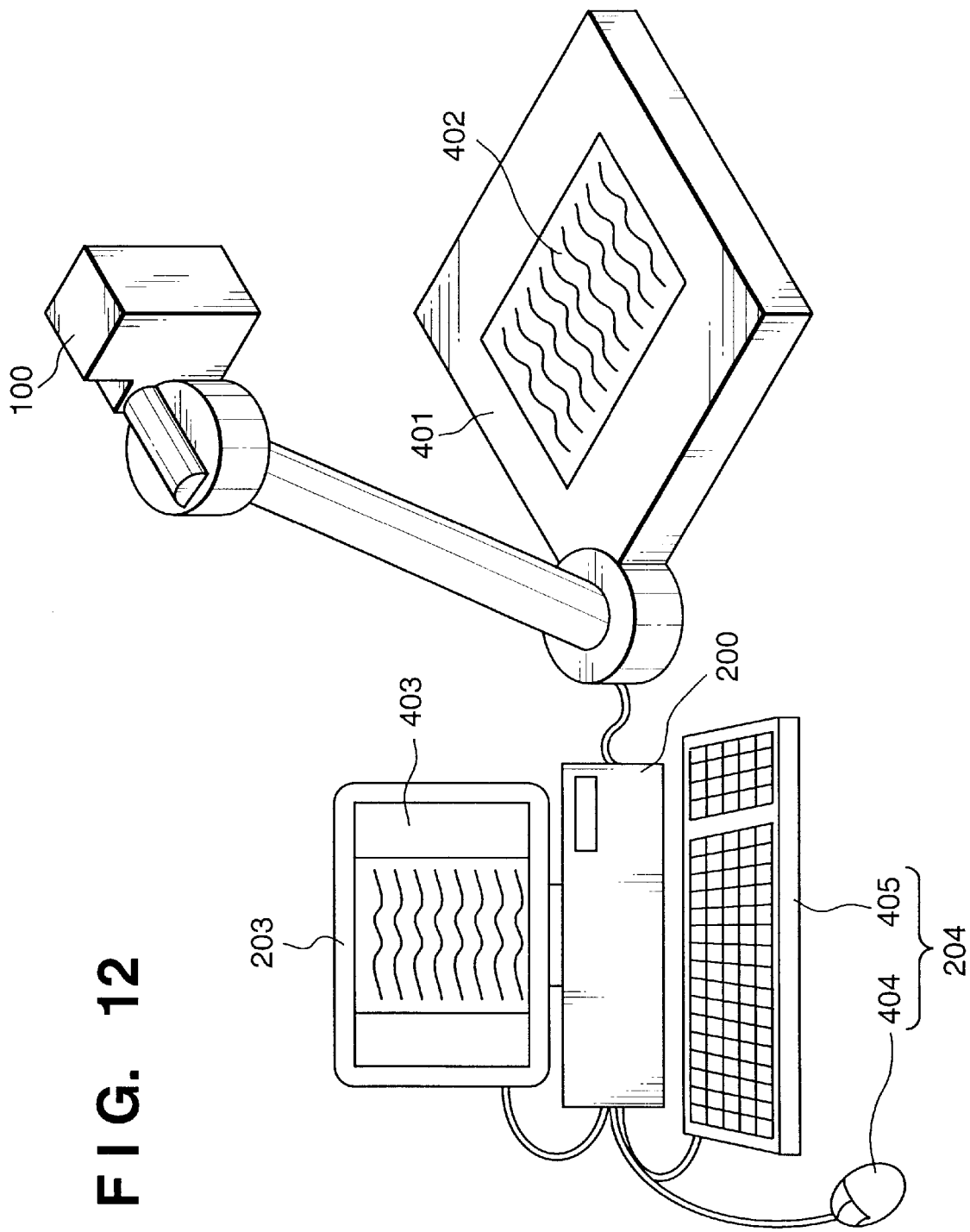
FIG. 12 is a perspective view of an electronic overhead projector (OHP) according to a second embodiment of the present invention.

Hereinafter, the second embodiment of the present invention will be described. The second embodiment describes a case where the camera apparatus 100 in the first embodiment is applied to a so-called electronic overhead projector (OHP). An image sensing system according to the second embodiment is shown in FIG. 12. Referring to FIG. 12, a computer terminal 200 (hereinafter referred to as a terminal) corresponds to the client 200.

In FIG. 12, reference numeral 401 denotes a platen where an original document 402 is placed and the camera apparatus 100 performs image sensing. Image data of the original document 402 which is sensed by the camera apparatus 100 is outputted to the terminal 200 and displayed on a display screen 403 of the display unit 203. The focal distance is adjusted so that the original document 402 is focused.

In a case where an object placed on the platen 401 has a three-dimensional shape, the conventional camera is able to focus only on a part of the three-dimensional object. Thus, when another part of the object is to be focused, an operator must manually adjust focusing, and this was a cumbersome operation to an operator.

The second embodiment provides an electronic OHP system capable of quickly focusing a portion of an object, subjected to image sensing, in a case where a three-dimensional object is placed on the platen 401. Note that a keyboard 405 and mouse 404 serve as the input unit 204 which is used when a command is inputted by an operator. Other configuration of the electronic OHP system according to the second embodiment is identical to that shown in FIG. 1. Thus, description thereof will be omitted.

The electronic OHP system according to the second embodiment performs AF control by detecting a part of image signals sensed by the camera apparatus 100 so that the part of the object to be sensed is focused. The detection area is shifted by a shift command sent by the terminal 200. Since such operation of the electronic OHP system is identical to that of the first embodiment, description thereof will be omitted.

Figure 13A:
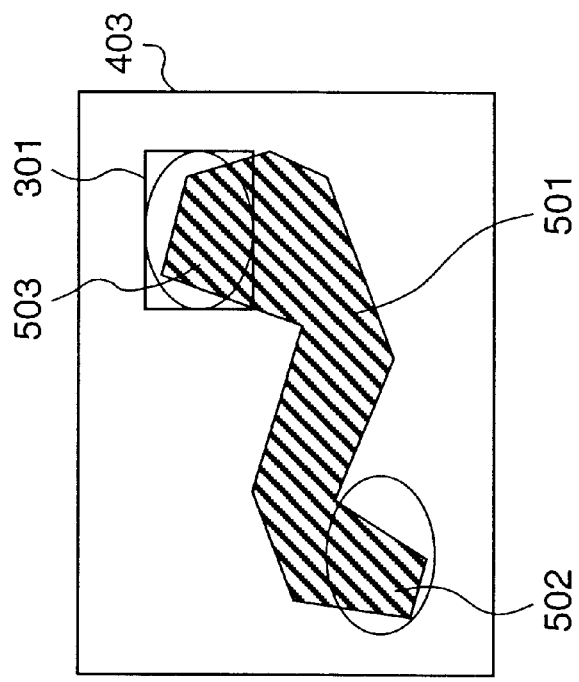
FIGS. 13A and 13B are an object displayed on a display screen of the second embodiment.
Figure 13B:
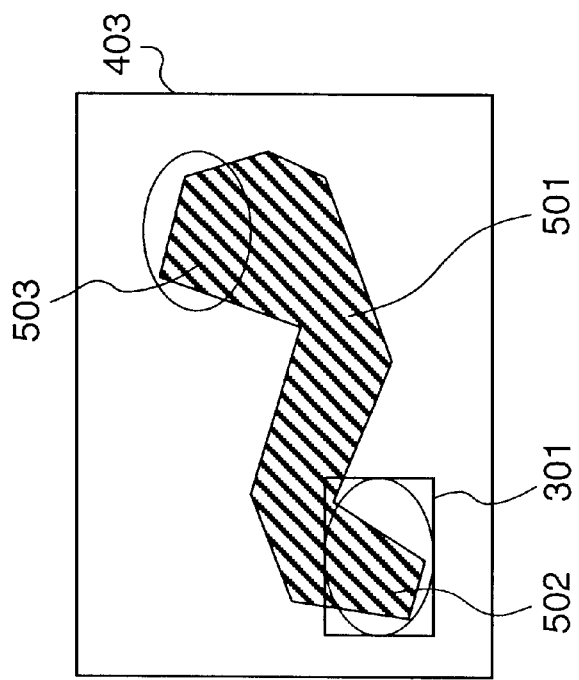

FIGS. 13A and 13B show examples of the display screen 403 at the time of sensing a three-dimensional object 501. Referring to FIGS. 13A and 13B, a detection frame 301 indicates the area where image signals of the camera apparatus 100 are detected. In a case where the detection area is shifted by a command inputted by the input unit 204, the detection frame 301 is moved accordingly.

FIG. 13A shows the object 501 displayed on the display screen 403 in a case where the detection area is shifted to a portion 502 of the object 501. AF control is performed on the portion 502. Herein, if the height of the object measured from the platen 401 is different between the portion 503 and the portion 502, the object portion 503 is out of focus. In such case, the detection area is shifted to the object portion 503 by input operation of the input unit 204, e.g., keyboard 405 or the like, and the object portion 503 is brought to focus. This state is shown in FIG. 13B.

As described above, by having the computer terminal 200 send a command to shift the detection area where image signals are detected and execute AF control on the shifted detection area, it is possible to focus a portion of interest of the object. By virtue of this feature, for instance, in a case where the electronic OHP according to the present embodiment is utilized in a meeting or the like where a three-dimensional object is shown, an efficient presentation can be given.

Note that although AF control is executed on the detection area by shifting the detection area where image signals are detected in the second embodiment, this may be set for AE control or white balance control. Moreover, these processing may be simultaneously executed.

As has been described above, according to the first and second embodiments, the detection-area-shift command having as small a data size as possible can be transmitted from the client (computer terminal) 200 to the camera apparatus 100. Moreover, an appropriate detection frame 301 can be displayed on the display screen of the client 200 in accordance with the size and shape of detection area of various camera apparatuses.

Furthermore, an appropriate image of a three-dimensional object can be sensed by the electronic OHP apparatus.

Third Embodiment

The third embodiment provides an image sensing system which brings each area of an image to focus, thereby obtaining an entirely focused image.

Figure 14:
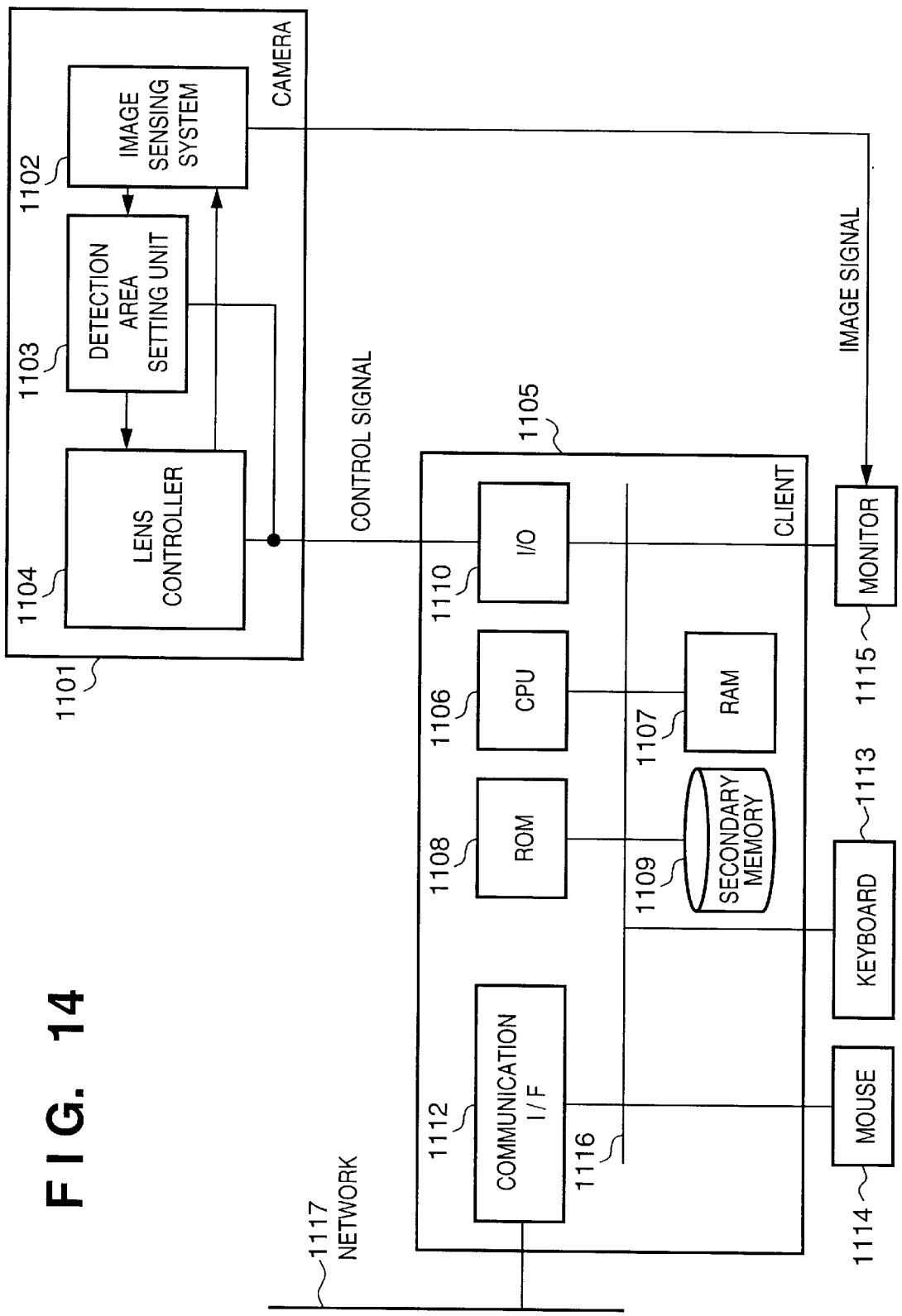
FIG. 14 is a block diagram showing an overall construction of an image sensing system according to a third embodiment of the present invention.

FIG. 14 is a block diagram showing a construction of an image sensing system according to the third embodiment.

The image sensing system according to the third embodiment includes a camera apparatus 1101 and a client device 1105 (hereinafter referred to as a client).

The camera apparatus 1101 comprises: an image sensing device which inputs an image, e.g., CCD or the like; an image sensing system 1102 which converts signals obtained by the image sensing device into standardized signals, e.g., NTSC signals or the like; a lens controller 1104 which automatically controls the focus and exposure of the camera apparatus; and the detection area setting unit 1103 which sets the detection area to which focus and exposure are adjusted. Note that in the camera apparatus 1101, focus, aperture stop, shutter speed, gain, white balance or the like can be controlled in accordance with a control command externally inputted.

The detection area setting unit 1103 and lens controller 1104 are connected with the client 1105 via control signal line. By outputting control signals to the camera apparatus 1101, the client 1105 can set the position and size of the detection area or parameters such as focus, aperture stop or the like. The client 1105 can obtain the current setting of parameters from the camera apparatus 1101. Although RS-232C or parallel I/O may be used as control signal lines, the communication method standard is not specified herein.

The lens controller 1104 comprises an AF circuit which automatically detects a focal point; and an AE circuit which automatically adjusts exposure. According to the third embodiment, the method of AF is controlled such that the high-frequency components are extracted from the image signals obtained by the image sensing system 1102 and the lens is driven so that the image is the clearest. The client 1105 can select either to control focus and exposure of the camera apparatus through the client 1105 via control signal lines or to let the camera apparatus 1101 independently perform AF or AE control.

In the client 1105, the CPU 1106 controls the entire client 1105. ROM 1108 stores programs for executing processing by the client 1105. RAM 1107 stores programs read out from the ROM 1108. Furthermore, a secondary memory 1109 comprising hard disc or the like stores camera parameters such as the result of focal point detection obtained by the camera apparatus 1101. Note that camera parameters may be stored in the RAM 1107.

An I/O unit 1110 is used to communicate control signals with the camera apparatus 1101. A communication I/F unit 1112 is used in communication with apparatuses, capable of processing similar to that of client 1105, via network 1117. By this, all camera apparatuses included in the clients connected to the network 1117 can be controlled by any client apparatuses.

A keyboard 1113 and mouse 1114 respectively serve as an input unit where an operator inputs a command to operate the camera apparatus 1101. A monitor 1115 displays a sensed image based on image signals outputted by the camera apparatus 1101.

Figure 15A:
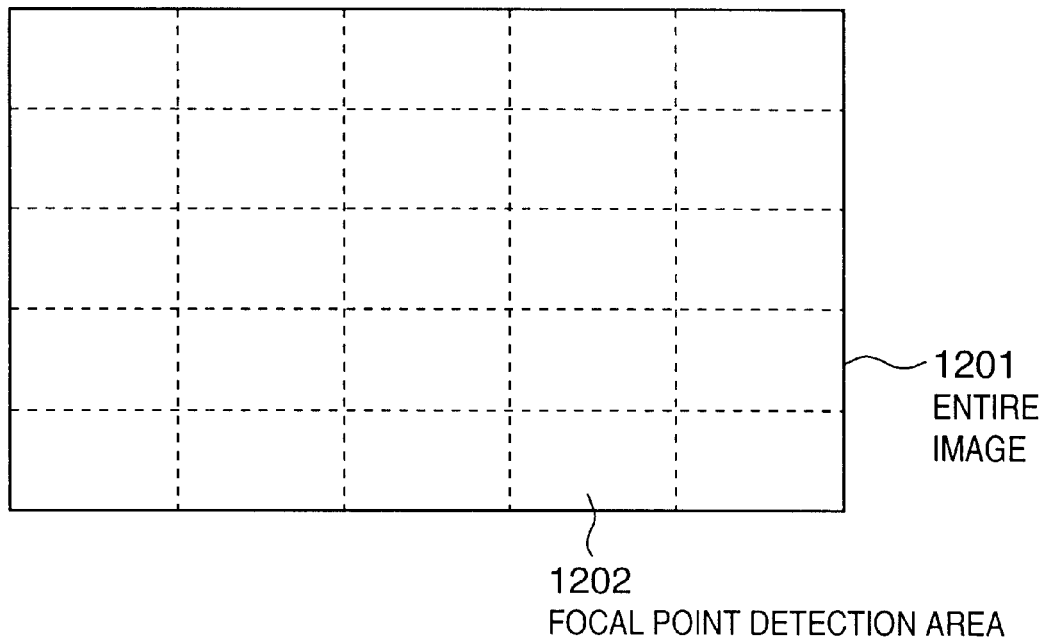
FIGS. 15A and 15B are explanatory views related to generating an entirely focused image by designating a detection area.
Figure 15B:
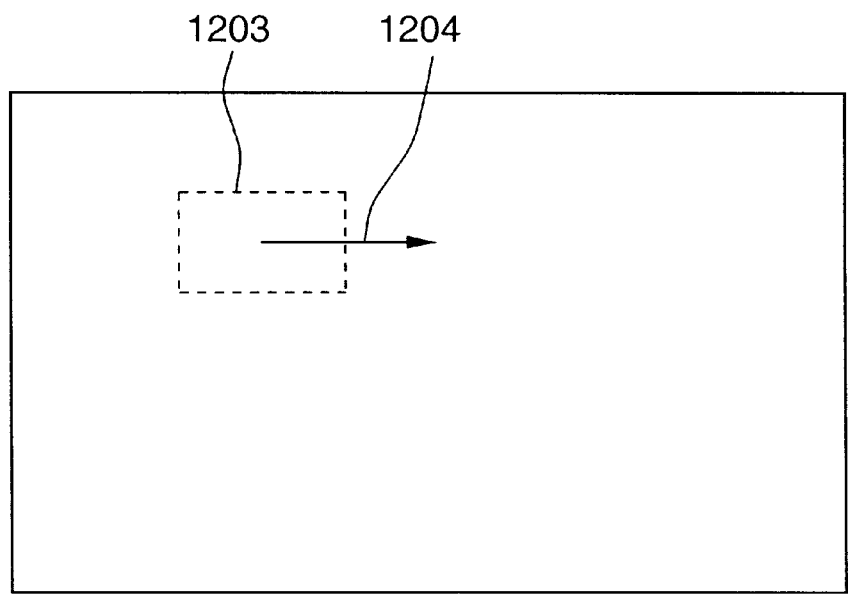

FIGS. 15A and 15B are conceptualized views showing basic principle of the third embodiment.

Hereinafter, a focus is described as an example of parameters set for the camera apparatus 1101 by the client 1105. FIG. 15A shows an entire image 1201 and a unit of focal point detection area 1202.

According to the third embodiment, automatic control of focus (AF) is performed by extracting high-frequency components by applying a frequency filter to image signals of the focal point detection area 1202 set by the detection area setting unit 1103, and adjusting the position of a focus lens so as to output the maximum high-frequency signals. Note that focusing may be realized by other methods.

Referring to FIGS. 15A and 15B, although the focal point detection area 1202 is shown as a rectangle, the shape and size of detection area is not limited as long as minimum image signals necessary for appropriate AF control are obtained.

FIG. 15B shows the state where a focal point detection area 1203 is sequentially shifted, as shown by arrow 1204, in unit of the area set as shown in FIG. 15A, by the detection area setting unit 1103 based on a command sent by the client 1105. In this manner, the focus is optimized in unit of each focal point detection area and image sensing is performed. Accordingly, it is possible to obtain an image where all the focal point detection areas are focused.

As described above, the focal point detection area is set to the size where AF control can be performed, then the image 1201 is divided into a plurality of focal point detection areas 1202 and AF control is performed sequentially on each of the divided detection areas. Then, focused images are obtained from each of the focal point detection areas and synthesized. As a result, an entirely focused image where the focus of the entire image is optimized can be obtained.

Figure 16:
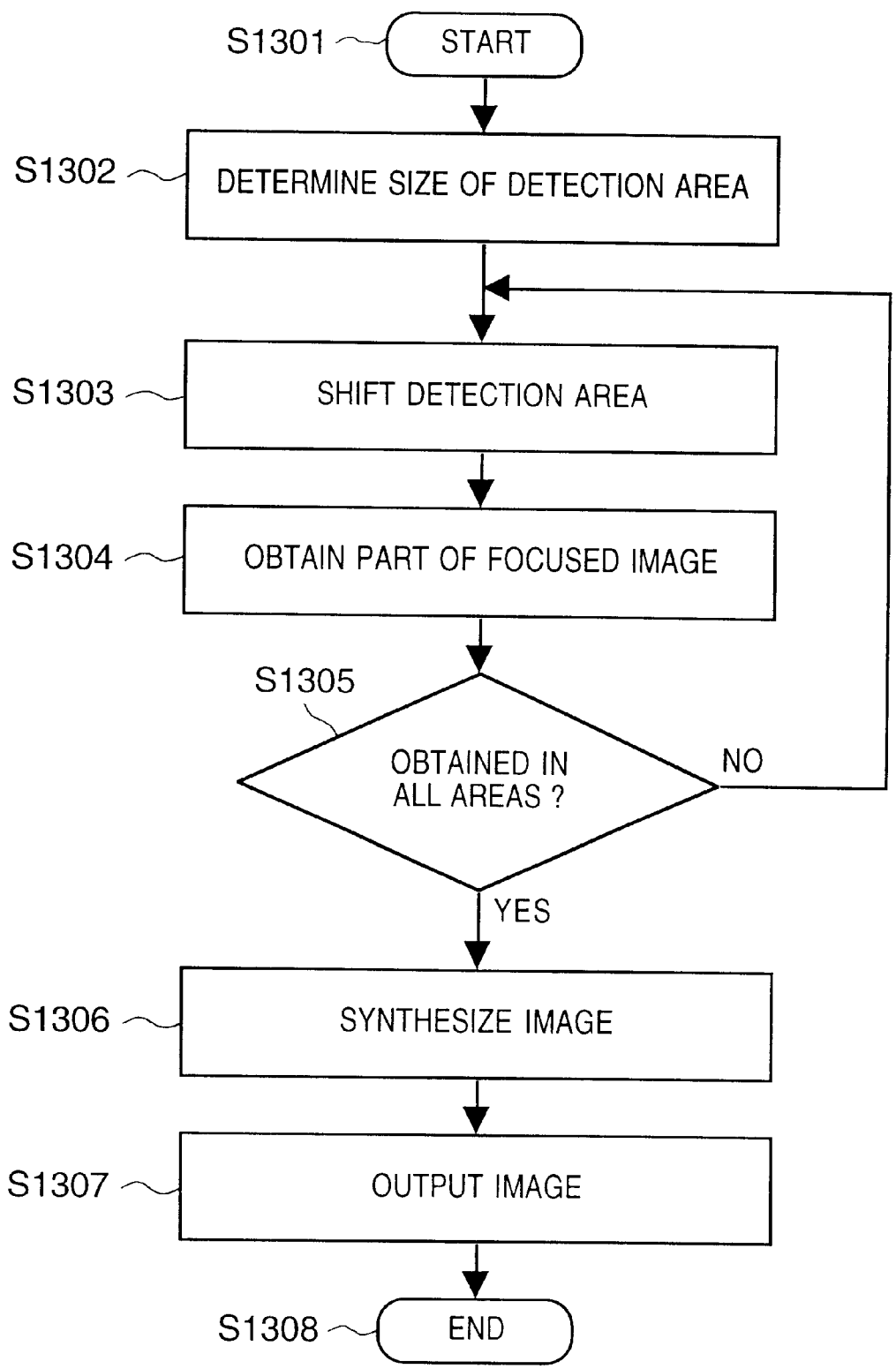
FIG. 16 is a flowchart showing processing of synthesizing an entirely focused image.

FIG. 16 is a flowchart of the basic processing according to the third embodiment.

Upon starting the image sensing system according to the third embodiment, the size of a focal point detection area is determined (step S1302). In the third embodiment, the focal point detection area is a rectangle, and its size can be changed in accordance with a required compression rate of a focused image or processing time.

Upon determining the size of the detection area, the image 1201 is divided accordingly, and the CPU 1106 sends a command to the detection area setting unit 1103 to sequentially shift the focal point detection position (step S1303). The lens controller 1104 then utilizes image signals in the focal point detection area 1202 to perform AF control, senses only an image of the focused detection area 1202 and stores the sensed image in the RAM 1107 (step S1304). The position of the focal point detection area is expressed by Cartesian coordinate system or polar coordinate system. For a method of instructing a shift of the focal point detection area, designation may be made by utilizing the absolute coordinate system or relative coordinate system. However the method for expressing such position or designation is not specified.

Then, it is determined whether or not focused images in all the focal point detection areas 1202 of the image 1201 are obtained (step S1305). If focused images are not obtained from the entire image 1201, the processing returns to step S1303 where the processing is moved to the next detection area.

As described above, by obtaining a focused image of each area for the entire image 1201 in unit of the focal point detection area and synthesizing each of the detection area images, an entirely focused image is obtained (step S1306). The synthesized image where the entire image is focused is outputted to the monitor (step S1307) and the program ends (step S1308).

Fourth Embodiment

Next, the fourth embodiment of the present invention is described in detail.

In the aforementioned third embodiment, the entire image is divided into a plurality of detection areas and parameters are optimized for each of the divided areas. Thus, if a focus distance is extremely different between neighboring areas, image nonconformity may become conspicuous in the boundary portion. In the fourth embodiment, the focal point detection area is consecutively shifted to the neighboring area, AF control is performed at each shifted position and image sensing is performed. Then, only a very small area in the central portion of each detection area is obtained and synthesized so as to obtain an entirely focused image where image nonconformity is minimized. An example thereof will be described hereinafter.

The construction of the image sensing system according to the fourth embodiment is identical to that shown in FIG. 14. Therefore, description thereof will be omitted.

The concept of the fourth embodiment is now explained with reference to FIGS. 17A and 17B.

Figure 17A:
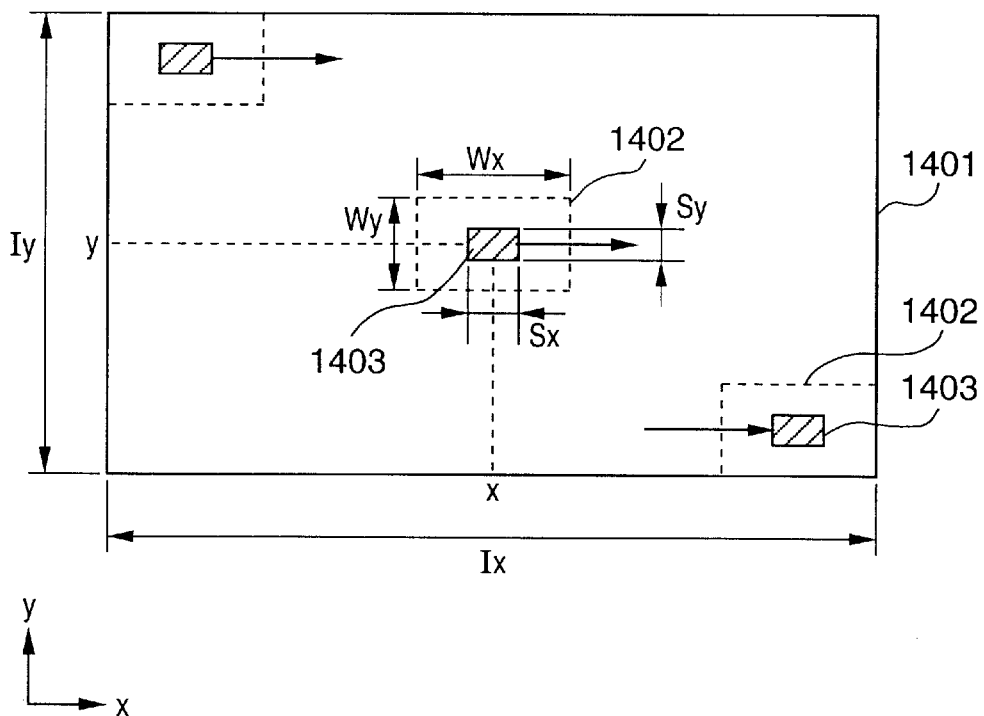
FIGS. 17A and 17B are explanatory view for explaining the basic principle of consecutively shifting a detection area according to a fourth embodiment of the present invention.

FIG. 17A shows the focal point detection area 1402 and a very small area used as a unit of area stored for synthesizing an image. The very small area will be referred to as an effective area 1403 hereinafter. The size of the effective area 1403 can be changed within a range of one pixel being a minimum size and the detection area 1402 being the maximum size. The size can be changed in accordance with conditions such as the processing time, processing capacity of an image processing apparatus, or required quality of the synthesized image.

Herein, a coordinate system is provided, assuming that the bottom left corner of an image is the origin, the horizontal side is the positive direction of x axis and the vertical side is the positive direction of y axis. Assume that the horizontal and vertical lengths of the displayed image 1401 are $I_x$ and $I_y$ respectively, the horizontal and vertical lengths of the detection area 1402 are $W_x$ and $W_y$ respectively, the horizontal and vertical lengths of the effective area 1403 are $S_x$ and $S_y$ respectively, and the effective area 1403 is located in the center (x, y) of the detection area 1402. In the coordinate system, assuming that a rectangular area is expressed by a coordinate of the bottom left point and a coordinate of the top right point, a focused image of the effective area 1403 expressed in the following coordinates (1) can be obtained as a part of focused image obtained by setting the detection area 1402 to the following coordinates (2).

$$\left(x - \frac{S_x}{2}, y - \frac{S_y}{2}\right)\left(x + \frac{S_x}{2}, y + \frac{S_y}{2}\right) \quad (1)$$

$$\left(x - \frac{W_x}{2}, y - \frac{W_y}{2}\right)\left(x + \frac{W_x}{2}, y + \frac{W_y}{2}\right) \quad (2)$$

Note that (x, y) is the coordinates of the center of the detection area, and x takes the range of $W_x/2 \leq x \leq I_x - W_x/2$, and y takes the range of $W_y/2 \leq y \leq I_y - W_y/2$.

In the above coordinates (1) and (2), each component of the coordinates (x, y) is independently altered by the following, (3) and (4).

$$x = \frac{W_x}{2}, \frac{W_x}{2} + S_x, \frac{W_x}{2} + 2S_x, \ldots, \frac{W_x}{2} + nS_x, \ldots, I_x - \frac{W_x}{2} \quad (3)$$

$$y = \frac{W_y}{2}, \frac{W_y}{2} + S_y, \frac{W_y}{2} + 2S_y, \ldots, \frac{W_y}{2} + nS_y, \ldots, I_y - \frac{W_y}{2} \quad (4)$$

As a result, a group of focused images of effective areas 1403 in the ranges of the following equations, (5) and (6), can be obtained.

$$\frac{W_x}{2} \leq x \leq I_x - \frac{W_x}{2} \quad (5)$$

$$\frac{W_y}{2} \leq y \leq I_y - \frac{W_y}{2} \quad (6)$$

In the displayed image 1401, with respect to areas where effective area 1403 cannot be obtained, i.e., areas in which the value of x or y is included in the following range (7) or (8), since the area is not closely looked at, the image of the detection area 1402 substitutes the image of the effective area 1403.

$$0 \leq x \leq \frac{W_x}{2}, I_x - \frac{W_x}{2} \leq x \leq I_x \quad (7)$$

$$0 \leq y \leq \frac{W_y}{2}, I_y - \frac{W_y}{2} \leq y \leq I_y \quad (8)$$

Figure 17B:
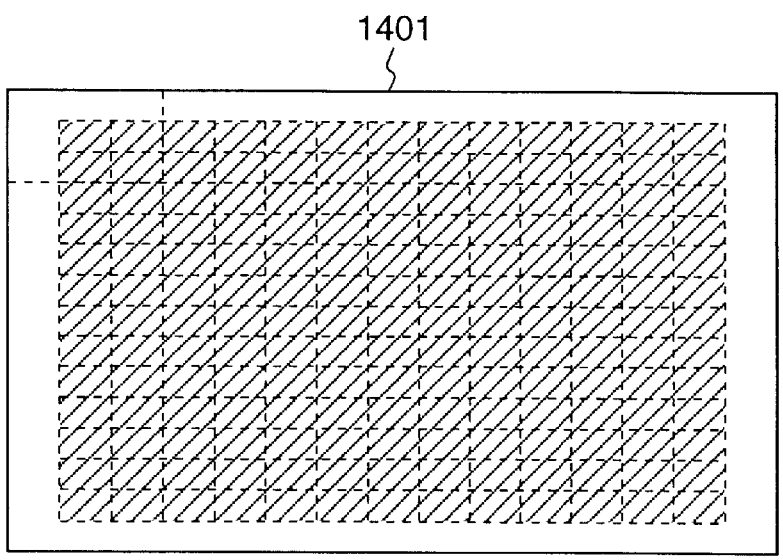

By synthesizing all the effective areas 1403 obtained in the foregoing manner, it is possible to obtain the displayed image 1401 where the entire areas are focused as shown in FIG. 17B.

Figure 18:
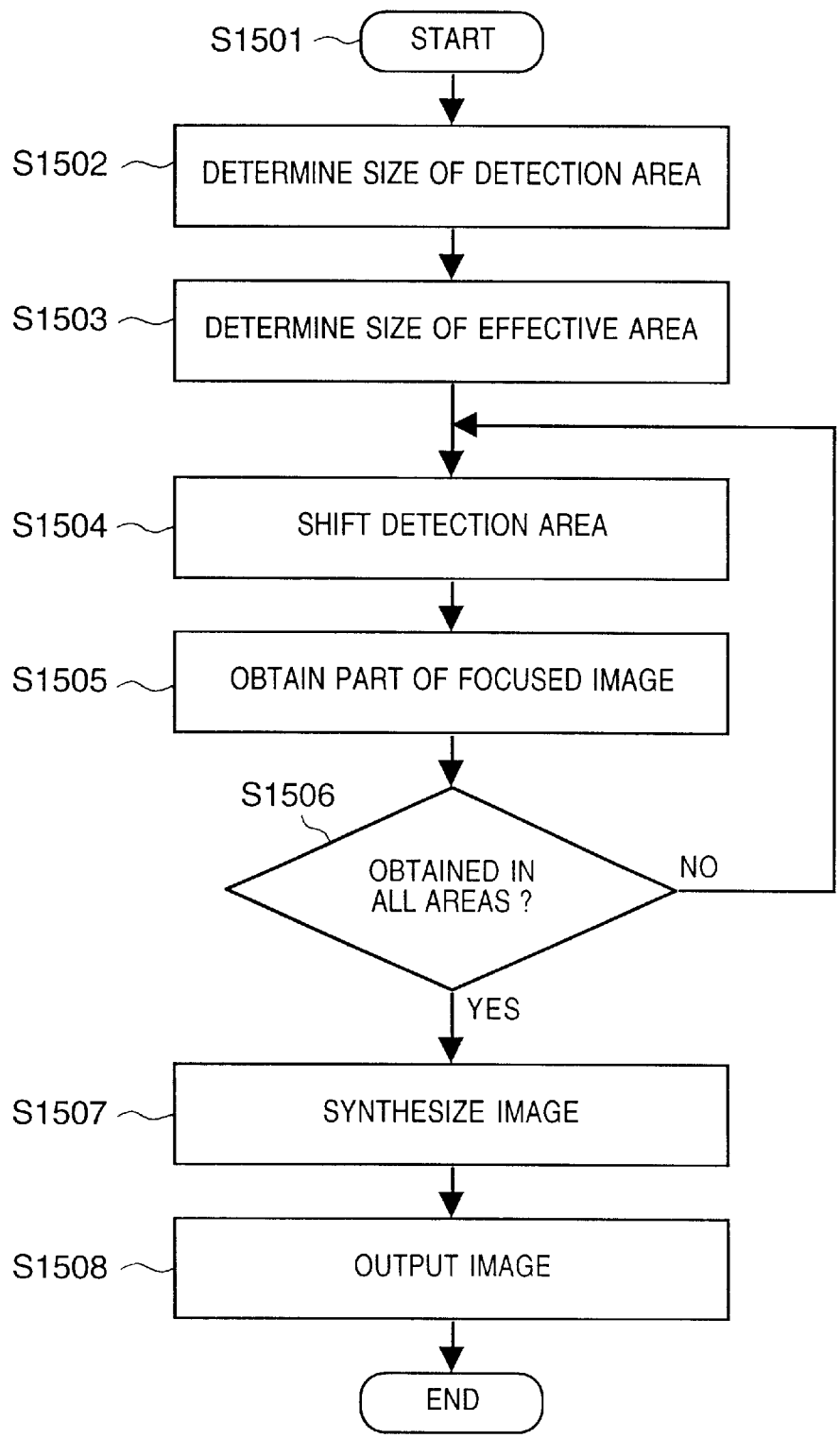
FIG. 18, is a flowchart showing operation processing of an image sensing system according to the fourth embodiment.

The flowchart of the image sensing system according to the fourth embodiment is shown in FIG. 18.

Upon starting the system (step S1501), the size of the focal point detection area 1402 is set (step S1502) and the size of the effective area 1403 is set (step S1503) according to a command sent by the client 1105. The effective area 1403 is included in the detection area 1402 as described above. Then, the focal point detection area 1402 is sequentially shifted by sending a command to the detection area setting unit 1103 (step S1504). At each of the shifted position, image sensing is performed by focusing on an object in the detection area 1402 (step S1505). From the sensed image, an image of the effective area 1403 is stored in the RAM 1107.

Each time a focused image is obtained from the effective area 1403, it is determined whether or not focused images for the entire displayed image 1401 are obtained (step S1506). If there is still a focused image whose effective area 1403 has not been stored in the RAM 1107, the detection area 1402 is shifted such that the effective area 1403 to be obtained next is included in the center of the detection area (step S1504), then AF control is performed, and the image of the effective area 1403 at that position is obtained and stored (step S1505). In the fourth embodiment, the effective area 1403 is obtained in the sequence such that the detection area 1402 is shifted by a very small amount in the order of raster scanning, starting from the top left, and each time the detection area is shifted, the focused image in the effective area 1403 is acquired. Note that the order of shifting the detection area 1402 in the displayed image 1401 is not limited to this example.

If it is determined in step S1506 that focused images for all the effective areas 1403 are obtained, the focused images of the effective areas 1403 stored respectively in the RAM 1107 are synthesized (step S1507). All the focused images are synthesized (FIG. 17B) by using the focused image obtained from the detection area 1402 for the periphery of the image (range defined by equations (7) and (8)) and by using the synthesized image of a plurality of focused images of effective areas for the central portion of the image (range defined by equations (5) and (6)). The image on which image synthesizing processing has been performed is outputted to the monitor 1115 (step S1508).

By the method described above, an image is collected in unit of the small area, i.e., effective area 1403, based on the focal point detection area 1402, and these images are synthesized to generate an entirely focused image and the generated image is displayed. Accordingly in the outputted image, differences in optical parameters are reduced in the neighborhood of the boundary where neighboring effective areas or the like are combined. As a result, image quality is improved.

Fifth Embodiment

The fifth embodiment of the present invention provides an image sensing system capable of controlling directional parameters such as pan/tilt, in addition to having the construction of the image sensing system according to the fourth embodiment.

Figure 19:
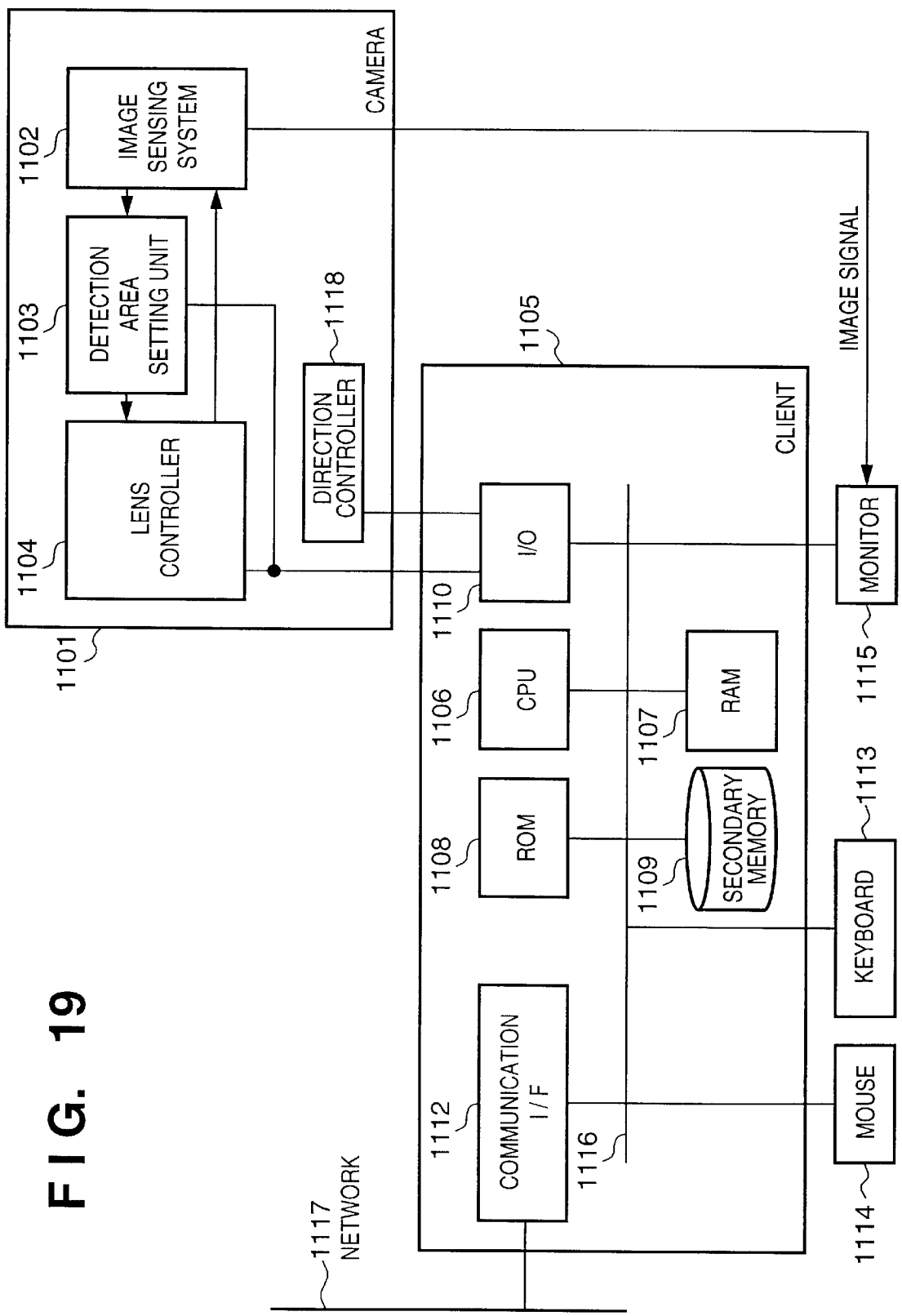
FIG. 19 is a block diagram showing an overall construction of an image sensing system according to a fifth embodiment of the present invention.

FIG. 19 is a block diagram showing a construction of an image sensing system according to the fifth embodiment. Referring to FIG. 19, besides the fact that a direction controller 1118 is provided in the camera apparatus 1101 for controlling the image sensing direction of a camera apparatus by the CPU 1106 through RS-232C or the like, other constructions are identical to that shown in FIG. 14. Thus, description thereof is not provided herein. In the fifth embodiment, the image sensing direction is controlled by panning (rotate on a vertical axis) or tilting (rotate on a horizontal axis).

Figure 20A:
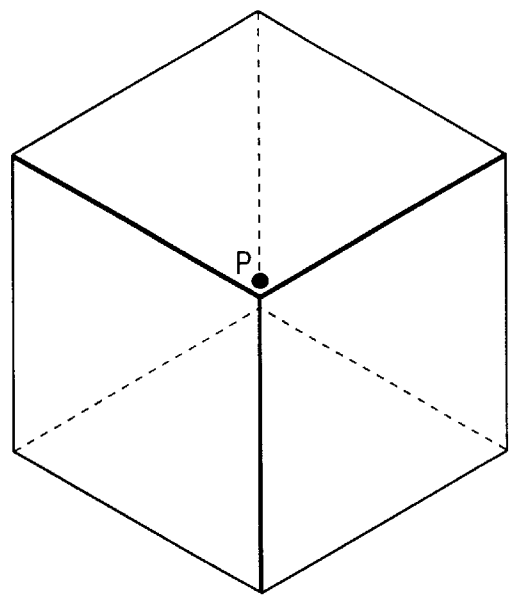
FIGS. 20A to 20C are explanatory views for explaining the basic principle of generating an entire- focused omnidirectional image.
Figure 20B:
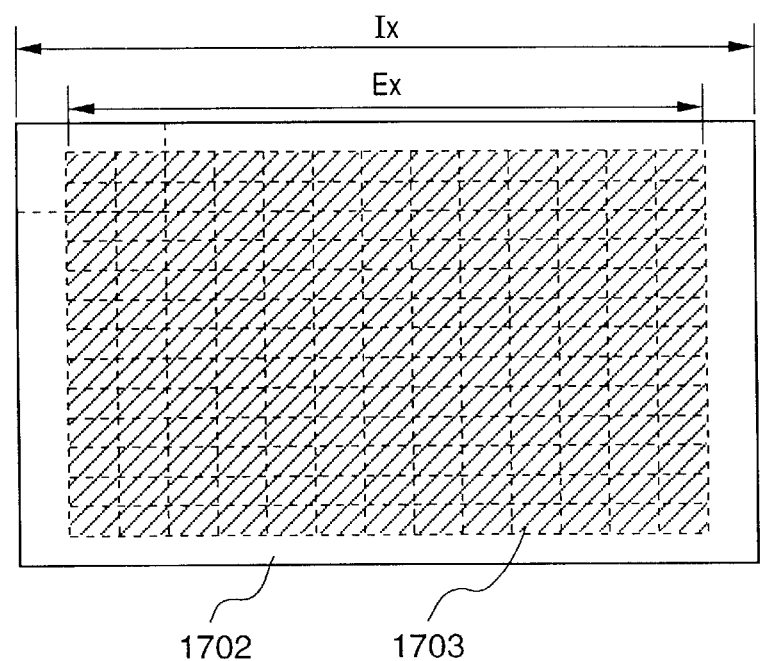
Figure 20C:
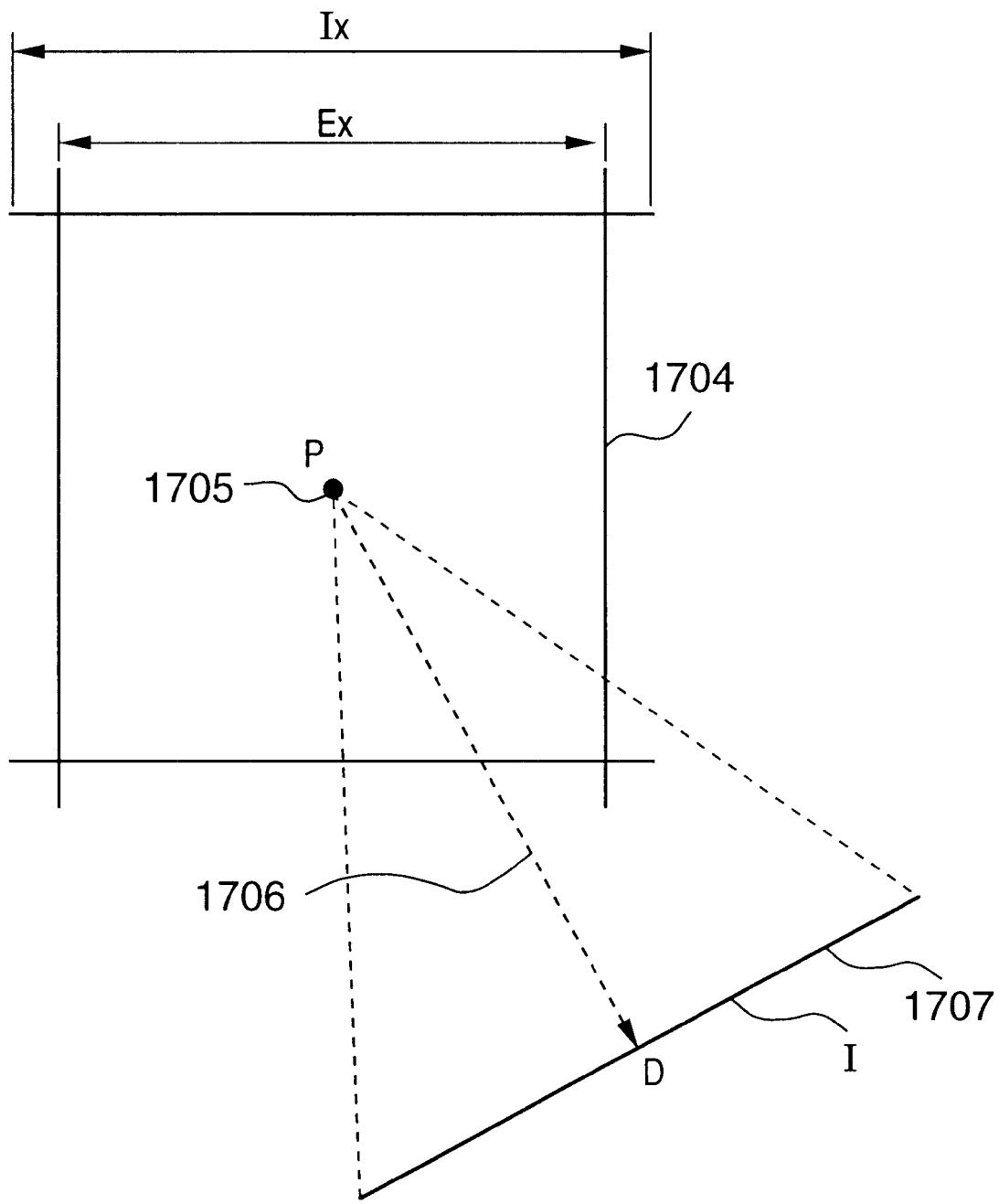

The principle of the fifth embodiment is shown in FIGS. 20A to 20C.

FIG. 20A is an omnidirectional model. More specifically, a surface of the cube shown in FIG. 20A represents an image picked up when the camera posture is controlled to face the corresponding direction (the direction extended from the center point P to the center of the plane surface). Each surface of the cube shown in FIG. 20A is constructed by an entirely focused image shown in FIG. 20B. An image 1702 is obtained by synthesizing a plurality of image areas 1703 as described in the fourth embodiment. Although a regular hexahedron model (cube) is used herein, other closed polyhedra, e.g., a regular tetrahedron or regular octahedron, may be used.

Once such omnidirectional image is sensed and stored in the RAM 1107, an image in an arbitrary image-sensing direction can be reproduced by using the image stored in the RAM 1107, without actually changing the direction of the image sensing system. To reproduce an image in an arbitrary direction, the method that an image of the polyhedron is projected from the center of the omnidirectional image model to an outer plane surface of the model can be applied.

To sense an entire-focused omnidirectional image, first, a camera apparatus is placed at the center point P, then an entirely focused image is sensed at four positions by panning a camera apparatus by 908, and at one of the four positions, the camera is tilted by 908 to sense an entirely focused image. The entirely focused image is obtained by performing posture control of a camera apparatus such that the optical axis of the camera is directed to the center of each surface of the model and executing the method described in the fourth embodiment. In the fifth embodiment, it is assumed that the bottom portion is not sensed, and panning and tilting control has a precision equivalent to one pixel or less.

FIG. 20B shows the entire image 1702 synthesized by the processing of the image sensing system according to the fourth embodiment, and a group of effective areas 1703 (very small area in a focal point detection area as described in the fourth embodiment). In FIG. 20B, the length of the image and the length of the group of effective areas are respectively indicated as $I_x$ and $E_x$.

FIG. 20C is a top plane view of the omnidirectional image model shown in FIG. 20A, cut horizontally through the center point P. Herein, description will be provided on four surface images laterally surrounding the center point P. The same image processing can be applied to the four surface images vertically surrounding the center point P.

By projecting the image on the image model 1704 to the plane surface 1707 from the center point 1705 (center point P) of the image model to the outward direction P-D 1706, it is possible to display an image as if the image of the plane surface 1707 is displayed without actually directing the image sensing system to the direction P-D 1706.

As a condition for sensing an omnidirectional image and synthesizing images in the above-described manner, the image sensing system 1102 must have a wide field of view. Considering an angle of viewing the group of effective areas from the center of a regular hexahedron, i.e., a viewpoint, a sufficient angle of view (field of view angle) is necessary to generate an omnidirectional image shown in FIG. 20C.

In general, it is difficult to obtain an image having 90° angle of view with very little distortion. However, there is a known technique where lens distortion is corrected by image processing. Furthermore, by increasing the number of surfaces of the polyhedron as the omnidirectional image model, the angle of view of each surface is reduced. Thus, by using a lens having little distortion in the omnidirectional image model having a small angle of view, the process of correcting distortion of images can be omitted. Upon obtaining a synthesized image of each plane which is processed as described above, the synthesized images are further combined to generate an entire-focused omnidirectional image.

Figure 21:
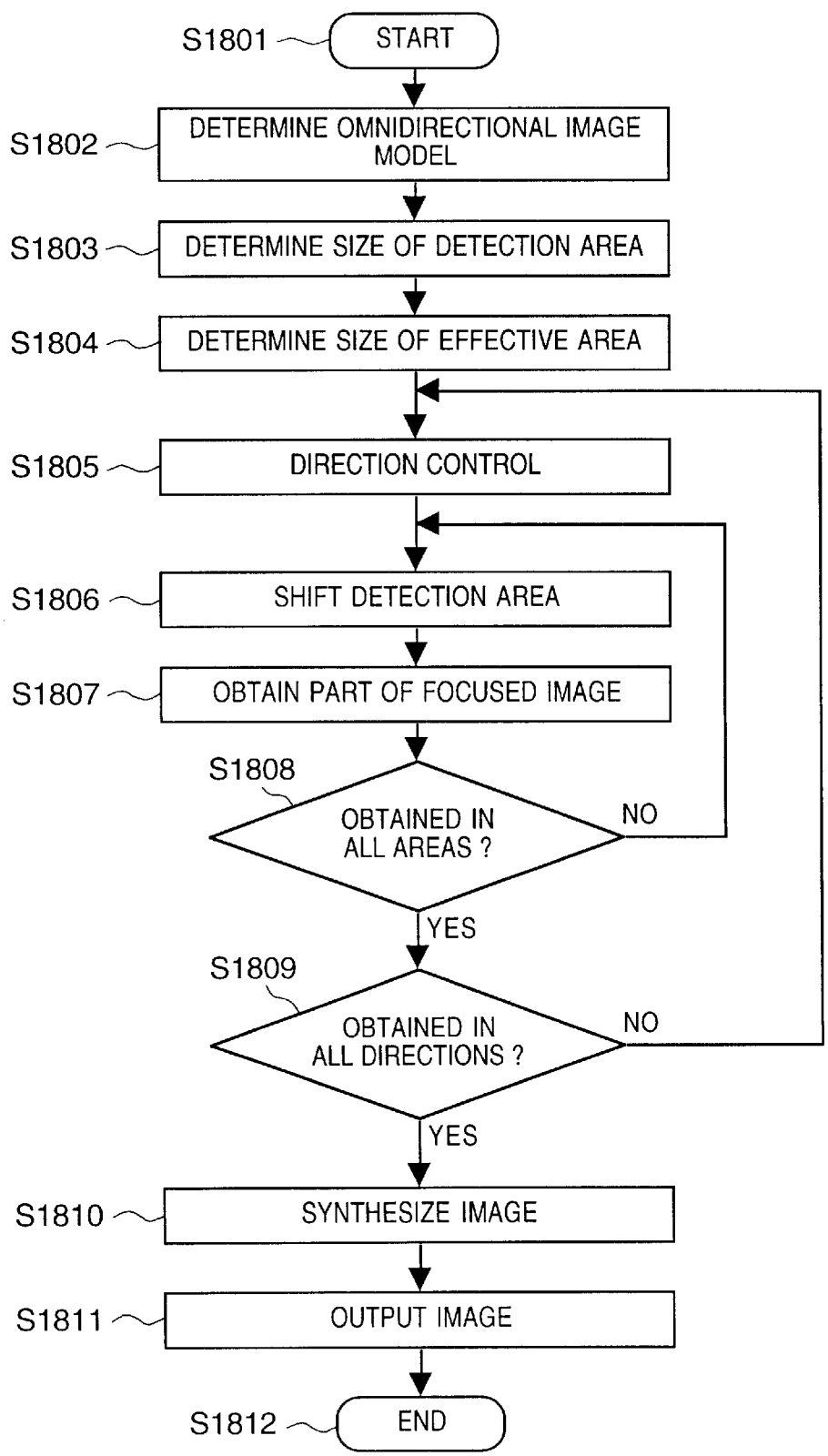
FIG. 21 is a flowchart showing processing for realizing the principle shown in FIGS. 20A to 20C.

FIG. 21 is a flowchart showing the processing related to the image sensing system according to the fifth embodiment. Upon starting a program (step S1801), an omnidirectional image model is set (step S1802), the size of focal point detection area is set (step S1803), and the size of effective area is set (step S1804). The processings in steps S1803 and S1804 are the same as that of steps S1502 and S1503 in FIG. 18.

Next, with respect to a plane surface of the omnidirectional image model, posture control of a camera apparatus is performed such that the camera apparatus is directed to the center of the plane surface (step S1805). Then, processings in steps S1806 to S1808 are performed. Since steps S1806 to S1808 correspond to steps S1504 to S1506 in FIG. 18 and the processings performed are the same, detailed description thereof will not be provided herein.

Upon sensing an image of a plane surface and storing the focused effective areas of the entire image in the RAM 1107, the camera apparatus is directed to another plane surface for forming an omnidirectional image model. Then, image sensing is performed and a focused effective area is stored in the RAM 1107 (step S1809) according to the above-described processing.

Then, the processing proceeds to step S1810 where an entire-focused omnidirectional image is generated by utilizing the group of effective areas for all five plane surfaces, which are stored in the RAM 1107. The synthesized image may be displayed as a panorama image by laying out the images of the lateral four plane surfaces (cutting one edge and unfolding the cube); alternatively, a part of the images may be displayed. The generated image is outputted to the monitor 1115 (step S1811) and the processing ends (step S1812).

In the above description of the third to fifth embodiments, the particular attention is given to focusing as a camera parameter, and description is provided on the method of obtaining a focused image in all portions of the image by utilizing the AF function of the camera apparatus. However, the present invention is not limited to these embodiments. With respect to other camera parameters, by automatically adjusting a detection area with respect to a part or combination of plural parameters, it is possible to obtain a synthesized image where camera parameters in each of the detection areas are optimized.

According to the above description of the third to fifth embodiments, even in a case of sensing a scene including a largely varying depth, it is possible to obtain an image where all portions of the image is focused.

Other Embodiments

The present invention can be applied to a system constituted by a plurality of devices (e.g., host computer, interface unit, camera, printer) or to an apparatus comprising a single device (e.g., various cameras).

Further, the object of the present invention can be also achieved by providing a storage medium storing program codes for performing the aforesaid processes to a system or an apparatus, reading the program codes with a computer (e.g., CPU, MPU) of the system or apparatus from the storage medium, then executing the program.

In this case, the program codes read from the storage medium realize the new functions according to the invention, and the storage medium storing the program codes constitutes the invention.

Further, the storage medium, such as a floppy disk, hard disk, an optical disk, a magneto-optical disk, CD-ROM, CD-R, a magnetic tape, a non-volatile type memory card, and ROM can be used for providing the program codes.

Furthermore, besides aforesaid functions according to the above embodiments are realized by executing the program codes which are read by a computer, the present invention includes a case where an OS (Operating System) or the like working on the computer performs a part or entire processes in accordance with designations of the program codes and realizes functions according to the above embodiments.

Furthermore, the present invention also includes a case where, after the program codes read from the storage medium are written in a function expansion card which is inserted into the computer or in a memory provided in a function expansion unit which is connected to the computer, a CPU or the like contained in the function expansion card or unit performs a part or entire process in accordance with designations of the program codes and realizes functions of the above embodiments.

In a case where the present invention is applied to the aforesaid storage medium, the storage medium stores program codes corresponding to the flowcharts described in the foregoing embodiments. Briefly, the storage medium stores modules which is indispensable to the image sensing system of the present invention.

The present invention is not limited to the above embodiments and various changes and modifications can be made within the spirit and scope of the present invention. Therefore, to appraise the public of the scope of the present invention, the following claims are made.

What is claimed is:

1. An image sensing system where a camera apparatus and a client device are connected for controlling the camera apparatus by the client device, comprising:
    an image sensor for sensing an object and obtaining an image signal of the object;
    a detector for detecting an image signal of a detection area in the obtained image signal;
    an adjusting unit for adjusting a camera parameter based on the image signal of the detection area;
    a storage device for storing the image signal of the detection area sensed by said image sensor after said adjusting unit adjusts the camera parameter;
    a shifting unit for shifting the detection area; and
    an image synthesizer for synthesizing image signals of a plurality of detection areas stored in said storage device.

2. The image sensing system according to claim 1, wherein said adjusting unit automatically adjusts a focal point based on the image signal of the detection area.

3. The image sensing system according to claim 1, further comprising a display device for displaying an image synthesized by said image synthesizer.

4. The image sensing system according to claim 1, wherein a case where all images of the object sensed by said image sensor are stored in said storage device, said image synthesizer synthesizers the images of all detection areas stored in said storage device.

5. The image sensing system according to claim 1, wherein said storage device stores only image signals of an effective area in the detection area, and said image synthesizer synthesizes images of a plurality of the effective areas stored in said storage device.

6. The sensing system according to claim 5, wherein the effective area is a central area of the detection area.

7. The image sensing system according to claim 5, wherein said shifting unit shifts the detection area such that the effective areas are not overlapped.

8. The image sensing system according to claim 1, further comprising a direction controller for controlling an image sensing direction of said image sensor,
    wherein said image synthesizer synthesizes images in unit of the image sensing direction controlled by said direction controlled by said direction controller.

9. The image sensing system according to claim 8, wherein said direction controller pans the image sensing direction by 90°.

10. The image sensing system according to claim 8, wherein said direction controller tilts the image sensing direction by 90°.

11. The image sensing system according to claim 8, wherein said direction controller controls the image sensing direction such that the image sensing direction is panned in four directions and tilted in one direction.

12. A control method of an image sensing system where a camera apparatus and a client device are connected for controlling the camera apparatus by the client device, comprising:
    sensing an object by an image sensor and obtaining an image signal of the object;
    detecting an image signal of a detection area in the obtained image signal;
    adjusting a camera parameter based on the image signal of the detection area;
    sensing the object by the image sensor after the camera parameter is adjusted;
    storing, in a storage device, the sensed image signal of the detection area;
    shifting the detection area; and
    synthesizing images of a plurality of detection areas stored in said storage device.

13. A recording medium including program codes for processing performed by a client device of an image sensing system where a camera apparatus and a client device are connected for controlling the camera apparatus by the client device, said program codes comprising;
    codes for detecting an image signal of a detection area, which is referred to when a camera parameter is adjusted, in an image signal obtained by sensing an object by an image sensor of the camera apparatus;
    codes for storing, in a storage device, the image signal of the detection area;
    codes for shifting the detection area; and
    codes for synthesizing images of a plurality of detection areas stored in said storage device.

* * * * *